US012754070B2

(12) United States Patent
Meng et al.

(10) Patent No.: US 12,754,070 B2
(45) Date of Patent: Oct. 6, 2026

(54) IMAGE SENSOR AND ELECTRONIC DEVICE

(71) Applicant: HUAWEI TECHNOLOGIES CO., LTD., Shenzhen (CN)

(72) Inventors: Peiwen Meng, Shenzhen (CN); Rui Guo, Shenzhen (CN); Zhanshi Yao, Shenzhen (CN); Zhenwei Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

(21) Appl. No.: 18/730,796

(22) PCT Filed: Jan. 3, 2023

(86) PCT No.: PCT/CN2023/070113

§ 371 (c)(1),
(2) Date: Jul. 22, 2024

(87) PCT Pub. No.: WO2023/138355

PCT Pub. Date: Jul. 27, 2023

(65) Prior Publication Data

US 2025/0102355 A1 Mar. 27, 2025

(30) Foreign Application Priority Data

Jan. 21, 2022 (CN) ......................... 202210074665.1

(51) Int. Cl.
*G01J 1/44* (2006.01)
*G01J 1/04* (2006.01)
*H04N 25/10* (2023.01)

(52) U.S. Cl.
CPC ............... *G01J 1/44* (2013.01); *G01J 1/0414* (2013.01); *H04N 25/10* (2023.01); *G01J 2001/448* (2013.01)

(58) Field of Classification Search
CPC ...... G01J 1/44; G01J 1/0414; G01J 2001/448; H04N 25/10; H10F 39/8063;
(Continued)

(56) References Cited

U.S. PATENT DOCUMENTS

2019/0064532 A1 2/2019 Riley, Jr. et al.
2019/0086579 A1 * 3/2019 Kim .................. G02B 27/4211
(Continued)

FOREIGN PATENT DOCUMENTS

EP 3812802 A1 4/2021

OTHER PUBLICATIONS

Philip Camayd-Mu oz, Conner Ballew, Gregory Roberts, and Andrei Faraon, "Multifunctional volumetric meta-optics for color and polarization image sensors," Optica 7, pp. 280-283 (Mar. 31, 2020).
(Continued)

*Primary Examiner* — Thanh Luu
*Assistant Examiner* — Mai Thi Ngoc Tran

(57) ABSTRACT

An image sensor and an electronic device are disclosed. The image sensor includes a cover, a first metasurface layer, and a detection layer, and the first metasurface layer is located between the cover and the detection layer. The first metasurface layer is configured to receive incident light, the incident light includes incident rays at a plurality of incident angles, the first metasurface layer includes a plurality of light splitting units, different light splitting units correspondingly receive incident rays from different incident angles, the plurality of light splitting units include light splitting units with different patterns, the splitting units separately split corresponding incident rays into light of a plurality of colors by using the different patterns. The detection layer is configured to: receive light of a plurality of colors split by the plurality of light splitting units, and convert the plurality of types of received light into electrical signals.

18 Claims, 33 Drawing Sheets

(58) Field of Classification Search
CPC .... H10F 39/8053; H10F 39/12; H10F 39/806; H10F 39/8067
See application file for complete search history.

(56) References Cited

U.S. PATENT DOCUMENTS

| | | | | |
|---|---|---|---|---|
| 2022/0208822 | A1* | 6/2022 | Yun | H10F 39/8063 |
| 2024/0147032 | A1* | 5/2024 | Miyata | G01J 4/04 |

OTHER PUBLICATIONS

Masashi Miyata, Naru Nemoto, Kota Shikama, Fumihide Kobayashi, and Toshikazu Hashimoto, "Full-color-sorting metalenses for high-sensitivity image sensors," Optica 8, 1596-1604 (2021), 9 pages.
P. B. Catrysse, N. Zhao, W. Jin, and S. Fan, "Subwavelength Color Router," in Conference on Lasers and Electro-Optics, Technical Digest Series (Optica Publishing Group, 2022), paper FM5F, 2 pages.

* cited by examiner

IMAGE SENSOR AND ELECTRONIC DEVICE

CROSS-REFERENCE TO RELATED APPLICATIONS

This application is a National Stage of International Patent Application No. PCT/CN2023/070113, filed on Jan. 3, 2023, which claims priority to Chinese Patent Application No. 202210074665.1, filed on Jan. 21, 2022, both of which are hereby incorporated by reference in their entireties.

TECHNICAL FIELD

This application relates to the field of optical technologies, and in particular, to an image sensor and an electronic device.

BACKGROUND

In an electronic device such as a mobile phone, a photographing function becomes an increasingly important function. Implementation of the photographing function mainly depends on an image sensor in the electronic device, for example, a complementary metal oxide semiconductor (complementary metal oxide semiconductor, CMOS) sensor.

In a related technology, an image sensor based on a metasurface structure is proposed, including a cover, a metasurface layer, and a detection layer. An incident ray reaches the metasurface layer through the cover, and the metasurface layer refracts the incident ray, so that light of different colors is refracted to detection regions of corresponding colors on the detection layer, and the detection layer converts received light into an electrical signal.

The metasurface layer includes a plurality of light splitting units. Different light splitting units receive incident rays at different incident angles, and the different light splitting units implement light splitting processing on the incident rays at the different incident angles by using different patterns. To ensure a light splitting effect of each light splitting unit, when the metasurface layer is designed, a pattern of each light splitting unit is separately designed by using an algorithm. As a result, a design process of a large-area metasurface layer is complex, and design efficiency is low.

SUMMARY

This application provides an image sensor and an electronic device. A pattern of a second light splitting unit is obtained by transforming a designed pattern of a first light splitting unit. In this way, a pattern of each light splitting unit does not need to be designed and manufactured in a targeted manner. This simplifies a design process of a large-area metasurface structure while ensuring light splitting efficiency, and improves design and processing efficiency of a metasurface layer.

According to a first aspect, this application provides an image sensor. The image sensor includes a cover, a first metasurface layer, and a detection layer, and the first metasurface layer is located between the cover and the detection layer.

The cover has a protection function, and incident light enters from the cover. The first metasurface layer is configured to receive incident light, the incident light includes incident rays at a plurality of incident angles, the first metasurface layer includes a plurality of light splitting units, different light splitting units correspondingly receive incident rays from different incident angles, the plurality of light splitting units include a first light splitting unit and a second light splitting unit, the first light splitting unit and the second light splitting unit have different patterns, the first light splitting unit and the second light splitting unit separately split corresponding incident rays into light of a plurality of colors by using the different patterns, that is, the first light splitting unit splits a corresponding incident ray into light of a plurality of colors by using the pattern, and the second light splitting unit splits a corresponding incident ray into light of a plurality of colors by using the pattern, and a pattern of the second light splitting unit is obtained by transforming a pattern of the first light splitting unit. The detection layer is configured to: receive light of a plurality of colors split by the plurality of light splitting units, and convert the received light of the plurality of colors into electrical signals.

At the metasurface layer of the image sensor provided in this application, the first light splitting unit and the second light splitting unit are two units configured to split an incident ray. Because light splitting needs to be performed at different incident angles, the patterns of the first light splitting unit and the second light splitting unit are different. In the image sensor provided in this application, the pattern of the first light splitting unit may be obtained through designing by using an algorithm, and the pattern of the second light splitting unit is obtained by transforming the pattern of the first light splitting unit. Therefore, when a large-area metasurface structure layer is designed, patterns of all light splitting units do not need to be specially optimized and designed, thereby simplifying a design process of the metasurface layer, and improving manufacturing efficiency of the metasurface layer.

In some possible implementations of this application, the transformation may be translation, that is, the pattern of the second light splitting unit is obtained by translating the pattern of the first light splitting unit. A direction and a distance of the translation are determined based on a relative position relationship between the second light splitting unit and the first light splitting unit.

Herein, the first light splitting unit and the second light splitting unit have different angle sensitivity to received incident rays. Therefore, if the second light splitting unit directly uses a pattern that is the same as that of the first light splitting unit, angle sensitivity of incident light is ignored, and consequently a light splitting effect at the detection layer is cracked. However, the pattern of the second light splitting unit formed by translating the pattern of the first light splitting unit can avoid cracking of the light splitting effect, so that the pattern of the second light splitting unit formed through translation can be configured to implement high-efficiency light splitting on an incident ray received by the second light splitting unit.

In some other possible implementations of this application, the transformation may alternatively be a transformation form such as rotation or flipping. This is not limited in this application.

For example, the second light splitting unit is located on a first side of the first light splitting unit, the pattern of the second light splitting unit is obtained by translating the pattern of the first light splitting unit towards a second side, and the second side and the first side are two opposite sides of the first light splitting unit.

For example, if the second light splitting unit is located on the left side of the first light splitting unit, the pattern of the second light splitting unit is obtained by translating the pattern of the first light splitting unit towards the right side; if the second light splitting unit is located on the right side of the first light splitting unit, the pattern of the second light splitting unit is obtained by translating the pattern of the first light splitting unit towards the left side; if the second light splitting unit is located on the upper side of the first light splitting unit, the pattern of the second light splitting unit is obtained by translating the pattern of the first light splitting unit downward; and if the second light splitting unit is located on the lower side of the first light splitting unit, the pattern of the second light splitting unit is obtained by translating the pattern of the first light splitting unit upward.

For another example, if the second light splitting unit is located on the upper left side of the first light splitting unit, the pattern of the second light splitting unit is obtained by translating the pattern of the first light splitting unit towards the lower right side; if the second light splitting unit is located on the lower right side of the first light splitting unit, the pattern of the second light splitting unit is obtained by translating the pattern of the first light splitting unit towards the upper left side; if the second light splitting unit is located on the lower left side of the first light splitting unit, the pattern of the second light splitting unit is obtained by translating the pattern of the first light splitting unit towards the upper right side; and if the second light splitting unit is located on the upper right side of the first light splitting unit, the pattern of the second light splitting unit is obtained by translating the pattern of the first light splitting unit towards the lower left side.

For example, the distance of the translation is positively correlated with a distance between the second light splitting unit and the first light splitting unit.

In some possible implementations of this application, patterns of any two adjacent light splitting units are different.

In some other possible implementations of this application, the plurality of light splitting units are arranged in an array, a row or a column of light splitting units are divided into a plurality of groups of light splitting units, one group of light splitting units in the plurality of groups of light splitting units includes a plurality of light splitting units that are consecutively arranged, and the plurality of light splitting units that are consecutively arranged have a same pattern.

For example, the plurality of light splitting units include a plurality of second light splitting units, and the plurality of second light splitting units are arranged around the first light splitting unit.

In some possible implementations of this application, an incident angle of an incident ray corresponding to the first light splitting unit is within a range centered on 0°, for example, −2° to 2°.

For example, the first light splitting unit corresponds to an incident ray whose incident angle is 0°.

In some possible implementations of this application, the first metasurface layer may not only perform color separation on an incident ray, but also perform polarization separation on the incident ray. In other words, the first metasurface layer is further configured to split a corresponding incident ray into light of a plurality of polarizations.

Correspondingly, the detection layer is configured to: receive a plurality of types of light output by the first metasurface layer, and convert the plurality of types of received light into electrical signals. Any two types of light in the plurality of types of light are different in at least one of color and polarization.

In some other possible implementations of this application, a polarization division function and a color division function may be implemented by different metasurface layers.

For example, the image sensor further includes a second metasurface layer. The second metasurface layer is configured to split received light into light of a plurality of polarizations.

The second metasurface layer is located between the cover and the first metasurface layer, and the detection layer is configured to: receive a plurality of types of light output by the first metasurface layer, and convert the plurality of types of received light into electrical signals; or the first metasurface layer is located between the cover and the second metasurface layer, and the detection layer is configured to: receive a plurality of types of light output by the second metasurface layer, and convert the plurality of types of received light into electrical signals.

Any two types of light in the plurality of types of light are different in at least one of color and polarization.

In some possible implementations of this application, the pattern of the second light splitting unit is directly obtained translating the pattern of the first light splitting unit.

In some other possible implementations of this application, the pattern of the second light splitting unit is obtained by translating the pattern of the first light splitting unit and then changing a part of graphics in a translated pattern.

For example, the pattern of the first light splitting unit includes a plurality of pixels arranged in an array. A proportion of changed pixels in the translated pattern to a total quantity of pixels in the pattern of the first light splitting unit does not exceed a threshold.

For example, a value range of the threshold is 20% to 30%.

For example, a form in which the pixel is changed includes at least one of the following:

- changing a shape of the pixel, changing a quantity of first pixels, or changing an arrangement of a first pixel and a second pixel.

The first pixel and the second pixel are two types of pixels corresponding to different material refractive indexes in the plurality of pixels.

For example, the distance of the translation is an integer multiple of a pixel size.

Optionally, the image sensor further includes a light filter, located between the first metasurface layer and the detection layer. The light filter is configured to separately filter light of a plurality of colors split by the light splitting unit, to filter out other stray light except light of a specific color, that is, filter out stray light of another color in light of each color in the light of the plurality of colors, so as to reduce crosstalk. The stray light herein refers to light of another color mixed into light of a specific color split by the light splitting unit, for example, green light and blue light mixed into red light split by the light splitting unit.

For example, the metasurface layer split incident light into red, green, and blue colors. In this case, the light filter filters out stray light of another color except red in the red light, filters out stray light of another color except green in the green light, and filters out stray light of another color except blue in the blue light.

According to a second aspect, this application provides an image sensing method. The image sensing method includes:

- receiving incident light, where the incident light includes incident rays at a plurality of incident angles;
- separately splitting the incident rays at the different incident angles into light of a plurality of colors by using two different patterns at a first metasurface layer, where one of the two different patterns is obtained by transforming the other one of the two different patterns; and converting the light of the plurality of colors into electrical signals.

Optionally, the method further includes:

splitting the incident rays at the different incident angles into light of a plurality of polarizations by using the two different patterns at the first metasurface layer; and the converting the light of the plurality of colors into electrical signals includes:

converting a plurality of types of light output by the first metasurface layer into electrical signals, where any two types of light in the plurality of types of light are different in at least one of color and polarization.

Optionally, the method further includes:

splitting received light into light of a plurality of polarizations by using a second metasurface layer; and receiving, by the second metasurface layer, light output by the first metasurface layer, where the converting the light of the plurality of colors into electrical signals includes: converting a plurality of types of light output by the second metasurface layer into the electrical signals, where any two types of light in the plurality of types of light are different in at least one of color and polarization; or receiving, by the second metasurface layer, the incident light, and receiving, by the first metasurface layer, light output by the second metasurface layer, where the converting the light of the plurality of colors into electrical signals includes: converting the plurality of types of light output by the first metasurface layer into the electrical signals, where any two types of light in the plurality of types of light are different in at least one of color and polarization.

Optionally, the method further includes:

before converting the light of the plurality of colors into the electrical signals, separately filtering the light of the plurality of colors, to filter out stray light of another color in light of each color in the light of plurality of colors.

According to a third aspect, this application provides an electronic device. The electronic device includes a processor and the image sensor according to any implementation of the first aspect, and the processor is configured to process an electrical signal output by the image sensor.

DESCRIPTION OF EMBODIMENTS

To make objectives, technical solutions, and advantages of this application clearer, the following further describes implementations of this application in detail with reference to the accompanying drawings.

Figure 1:
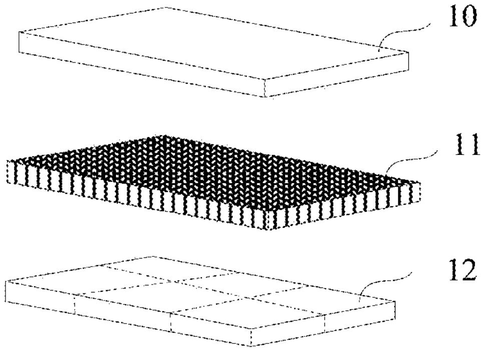
FIG. 1 is a diagram of a structure of an image sensor according to an embodiment of this application.

FIG. 1 is a diagram of a structure of an image sensor according to an embodiment of this application. Refer to FIG. 1. The image sensor includes a cover 10, a first metasurface layer 11, and a detection layer 12. The first metasurface layer 11 is located between the cover 10 and the detection layer 12.

The cover 10 has a protection function, and incident light enters from the cover. The first metasurface layer 11 is configured to receive incident light, and the incident light includes incident rays at a plurality of incident angles.

Figure 2:
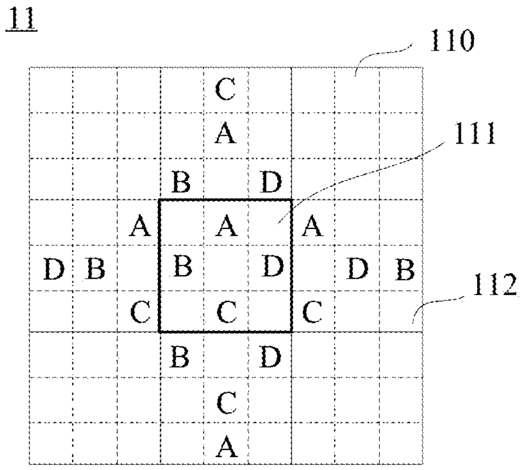
FIG. 2 is a diagram of an example structure of a metasurface layer according to an embodiment of this application.

FIG. 2 is a diagram of a structure of a metasurface layer according to an embodiment of this application. Refer to FIG. 2. The first metasurface layer 11 includes a plurality of light splitting units 110, and different light splitting units 110 correspondingly receive incident rays from different incident angles. The plurality of light splitting units 110 include a first light splitting unit 111 and a second light splitting unit 112. The first light splitting unit 111 and the second light splitting unit 112 have different patterns, the first light splitting unit 111 and the second light splitting unit 112 separately split corresponding incident rays into light of a plurality of colors by using the different patterns, and the pattern of the second light splitting unit 112 is obtained by transforming the pattern of the first light splitting unit 111. Incident angles of the incident rays corresponding to the first light splitting unit 111 and the second light splitting unit 112 are different.

The detection layer 12 is configured to: receive light of a plurality of colors split by the plurality of light splitting units 110, and convert the received light of the plurality of colors into electrical signals.

The first metasurface layer 11 is configured to perform color separation on light to implement routing of light of different colors, and may also be referred to as an optical router device.

FIG. 1 is an exploded diagram of components of the image sensor. Actually, a distance between the components is not limited in this application. For example, the cover 10 may be bonded to the first metasurface layer 11, and there may be a specific gap between the first metasurface layer 11 and the detection layer 12.

At the metasurface layer of the image sensor provided in this application, the first light splitting unit and the second light splitting unit are two units configured to split an incident ray. Because light splitting needs to be performed at different incident angles, the patterns of the first light splitting unit and the second light splitting unit are different. In the image sensor provided in this application, the pattern of the first light splitting unit may be obtained through designing by using an algorithm, and the pattern of the second light splitting unit is obtained by transforming the pattern of the first light splitting unit. Therefore, when a large-area metasurface structure layer is designed, patterns of all light splitting units do not need to be designed one by one, thereby simplifying a design process of the metasurface layer, and improving design and processing efficiency of the metasurface layer.

For example, the cover 10 is a transparent cover, for example, a glass cover or a resin cover.

For example, the detection layer 12 is a CMOS detection layer, and includes a plurality of detection regions (or referred to as imaging regions) corresponding to the plurality of light splitting units 110. Each detection region includes a plurality of detection sub-regions, and the plurality of detection sub-regions are respectively configured to: receive light of a plurality of colors split by each corresponding light splitting unit, and convert the received light of the plurality of colors into electrical signals.

In some possible implementations of this application, the transformation may be translation, that is, the pattern of the second light splitting unit is obtained by translating the pattern of the first light splitting unit. A direction and a distance of the translation are determined based on a position relationship between the second light splitting unit and the first light splitting unit and an incident angle.

Herein, the translation means moving the pattern of the first light splitting unit by using an outer boundary of an original pattern as a photo frame, and cutting a part protruding outside the photo frame into a position vacated after the movement in the photo frame. FIG. 2 is used as an example. The pattern of the first light splitting unit 111 is moved leftward by one column. In this case, a column in which A and C are located reaches the left boundary, the column in which B is located protrudes outside a photo frame, and the column in which B is located is supplemented to the right side of a column in which D is located, to obtain the pattern of the second light splitting unit 112 on the right side of the first light splitting unit 111.

In some other possible implementations of this application, the transformation may alternatively be a transformation form such as rotation or flipping. This is not limited in this application.

For example, the second light splitting unit is located on a first side of the first light splitting unit, the pattern of the second light splitting unit is obtained by translating the pattern of the first light splitting unit towards a second side, and the second side and the first side are two opposite sides of the first light splitting unit.

With reference to the figure, the following describes how the pattern of the second light splitting unit is obtained by translating the pattern of the first light splitting unit.

Figure 3:
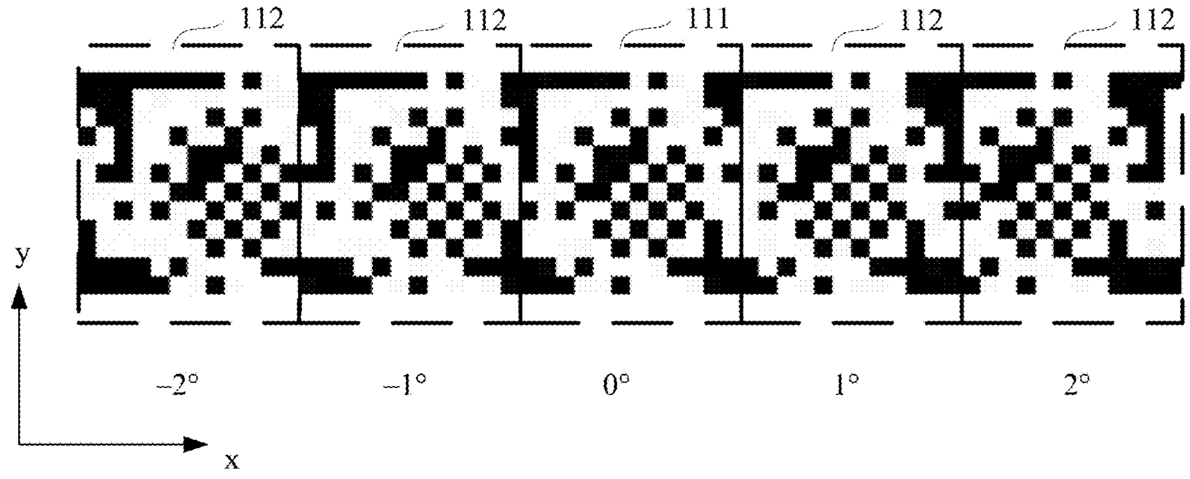
FIG. 3 is a diagram of a structure of a row of light splitting units according to an embodiment of this application.

FIG. 3 is a diagram of a structure of a row of light splitting units according to an embodiment of this application. Refer to FIG. 3. The row of light splitting units 110 includes: a first light splitting unit 111 located in the middle and second light splitting units 112 located on two sides of the first light splitting unit 111.

The first light splitting unit 111 has a first pattern, and the second light splitting unit 112 has a second pattern.

It should be noted that, in this embodiment of this application, the second pattern is a pattern transformed from the first pattern. There may be a plurality of second patterns, and the plurality of second patterns may be a same pattern or include a plurality of different patterns. For example, a plurality of second light splitting units 112 correspond to different angles of incident rays, and second patterns of these second light splitting units 112 may be different, but all the second patterns are transformed from the first pattern.

For example, in the row of light splitting units 110, a second pattern located on the left side of the first pattern is obtained by translating the first pattern towards the right side, and a second pattern located on the right side of the first pattern is obtained by translating the first pattern towards the left side. A protruding part of the pattern after the translation is spliced to the position that is vacated after translation.

For ease of observation, reference may be made to the simplified pattern of the light splitting unit in FIG. 2. The second light splitting unit 112 on the right side of the first light splitting unit 111 is obtained by moving the first light splitting unit 111 leftward. After the first light splitting unit 111 is moved leftward by one column, the column in which A and C are located reaches the leftmost side. In this case, the column in which B is located is translated and protrudes outside the photo frame. In this case, the column in which B is located is spliced to the right side to obtain the pattern of the second light splitting unit 112 on the right side of the first light splitting unit 111.

Figure 4:
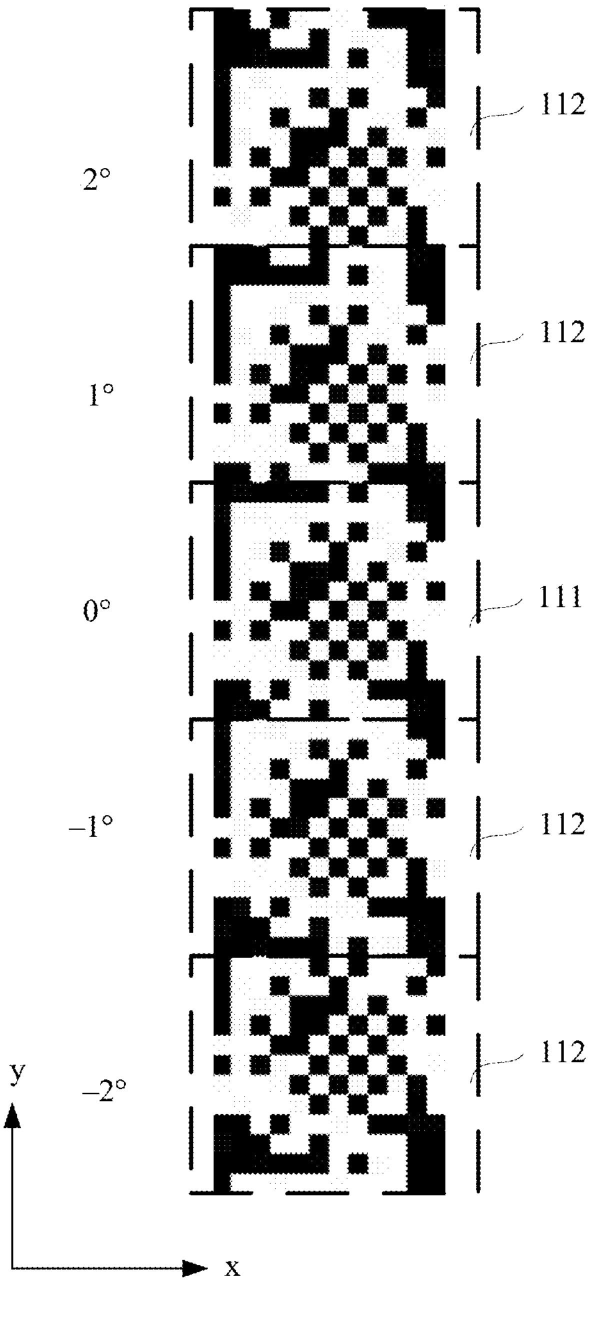
FIG. 4 is a diagram of a structure of a row of light splitting units according to an embodiment of this application.

FIG. 4 is a diagram of a structure of a row of light splitting units according to an embodiment of this application. Refer to FIG. 4. The column of light splitting units 110 includes:

a first light splitting unit 111 located in the middle and second light splitting units 112 located on two sides of the first light splitting unit 111.

For example, in the column of light splitting units 110, a second pattern located on an upper side of the first pattern is obtained by translating the first pattern downward, and a second pattern located on a lower side of the first pattern is obtained by translating the first pattern upward.

In some possible implementations of embodiments of this application, the first metasurface layer 11 includes only one first light splitting unit 111, and the remaining light splitting units are all second light splitting units 112, that is, all the light splitting units 112 are obtained by transforming the first light splitting unit 111. In some other possible implementations of embodiments of this application, the first metasurface layer 11 includes a plurality of first light splitting units 111, and the remaining light splitting units are all second light splitting units 112. Generally, the second light splitting unit 112 is obtained by transforming a first light splitting unit 111 adjacent to the second light splitting unit 112.

The following first describes a case in which there is only one first light splitting unit 111. Generally, in this case, an incident angle of an incident ray corresponding to the first light splitting unit 111 is within a range centered on 0°, for example, −2° to 2°. For example, the first light splitting unit 111 corresponds to an incident ray with an incident angle of 0°, and the plurality of second light splitting units 112 are arranged around the first light splitting unit 111.

For a light splitting unit that is in the same row or column as the first light splitting unit 111, a pattern of the second light splitting unit 112 may be obtained by translating the pattern of the first light splitting unit 111 only once. However, for a light splitting unit that is in a different row and a different column from the first light splitting unit 111, two translations need to be performed. For example, a pattern of a light splitting unit that is in the same row or in the same column as the first light splitting unit 111 is obtained through translation for the first time, and then a pattern of the second light splitting unit 112 is obtained by translating the pattern of the light splitting unit obtained through translation for the first time. Certainly, the pattern of the light splitting unit that is in a different row and a different column from the first light splitting unit 111 may also be obtained through one translation along an oblique direction, and an effect is the same as that of the foregoing two translations. For example, a pattern of the light splitting unit located on the upper left side of the first light splitting unit 111 may be obtained by translating the pattern of the first light splitting unit 111 towards the lower right side.

A case in which there are the plurality of first light splitting units 111 may further include the following two cases. In a first case, the plurality of first light splitting units 111 are designed independently during designing. In a second case, only a first light splitting unit 111 corresponding to an incident ray whose incident angle is 0° is designed initially. However, when a translation amplitude of the first light splitting unit 111 is large, a light splitting effect is greatly reduced. In this case, a pattern of a second light splitting unit 112 obtained after the translation amplitude is large may be re-designed as a new first light splitting unit 111, a pattern of a subsequent second light splitting unit 112 is formed through translation.

Therefore, in this embodiment of this application, generally, the first light splitting unit 111 and the second light splitting unit 112 obtained by transforming the first light splitting unit 111 are within a specific range, are not quite far away from each other, and a difference between angles of incident rays received by the first light splitting unit 111 and the second light splitting unit 112 is not large. In this way, it can be ensured that a pattern obtained by translating the first light splitting unit 111 can implement a light splitting function of the second light splitting unit 112. For example, a difference between the incident angles of the incident rays received by the first light splitting unit 111 and the second light splitting unit 112 obtained by transforming the first light splitting unit 111 is within 10°.

In this embodiment of this application, a pattern of the light splitting unit 110 includes a plurality of pixels arranged in an array, and these pixels are formed by two different materials, to obtain mosaic patterns shown in FIG. 3 and FIG. 4.

FIG. 3 is used as an example. A middle dashed line box shows a first pattern of the first light splitting unit 111 at the metasurface layer. According to a relative position relationship between a mosaic pattern in the row direction (x direction) and an angle of an incident ray, internal pixel arrangement is adjusted by performing x-direction translation on the mosaic pattern, to obtain a second pattern of a second light splitting unit 112 corresponding to an angle such as ±1° and ±2° in the x direction.

As shown in FIG. 3, the relative position relationship between the mosaic pattern and the angle of the incident ray herein refers to a position relationship between patterns corresponding to incident rays with different incident angles in the x direction. For example, if a pattern corresponding to an incident angle 1° is on the right side of an incident angle 0°, the pattern corresponding to the incident angle 1° needs to be obtained from a pattern corresponding to the incident angle 0°, and the pattern corresponding to the incident angle 0° needs to be moved leftward.

Similarly, FIG. 4 is used as an example. Based on a relative position relationship between a mosaic pattern in a column direction (a y direction) and an angle of an incident ray, internal pixel arrangement may be adjusted by performing y-direction translation on the mosaic pattern, to obtain a second pattern of a second light splitting unit 112 corresponding to an angle such as ±1° or ±2° in the y direction. A two-dimensional metasurface layer structure may be designed in the foregoing manner. A design manner is simpler, and design does not need to be performed pixel by pixel, thereby simplifying a design and processing process.

As shown in FIG. 4, the relative position relationship between the mosaic pattern and the angle of the incident ray herein refers to a position relationship between patterns corresponding to incident rays with different incident angles in the y direction. For example, if a pattern corresponding to an incident angle 1° is on an upper side of an incident angle 0°, the pattern corresponding to the incident angle 1° needs to be obtained from a pattern corresponding to the incident angle 0°, and the pattern corresponding to the incident angle 0° needs to be moved downward.

For example, a translation distance is positively correlated with a distance between the first light splitting unit 111 and the second light splitting unit 112.

That is, if the distance between the first light splitting unit 111 and the second light splitting unit 112 is longer, when the pattern of the first light splitting unit 111 is translated to obtain the pattern of the second light splitting unit 112, a longer distance needs to be moved.

For example, the first light splitting unit 111 is a light splitting unit corresponding to an incident ray with an incident angle of 0°. The distance s of the pattern of the second light splitting unit 112 obtained by translating the pattern of the first light splitting unit 111 may be calculated based on the following formula (1):

$$s=\alpha\cdot z\cdot\tan\theta, \tag{1}$$

or $$s=\alpha\cdot z\cdot\cos\theta,$$

or $$s=\alpha\cdot z\cdot\sin\theta,$$

or $$s=\alpha\cdot z\cdot\theta$$

In the formula (1), θ is an incident angle of an incident ray corresponding to the second light splitting unit, z is an imaging distance, and α is an imaging coefficient including a condition such as a refractive index. To ensure an imaging effect of a ray obtained by the light splitting unit through splitting at the detection layer, it is limited herein that $\alpha\in[0, 10]$, and $z\in[\max(x, y)/5, 5\times\max(x, y)]$, where (x, y) is a size of a pixel in an x direction and a size of the pixel in a y direction. It should be noted that, a paraxial approximation condition is used in the formula (1). Therefore, this formula is valid only in a condition of small-angle incidence, for example, −10° to 10°.

Figure 5:
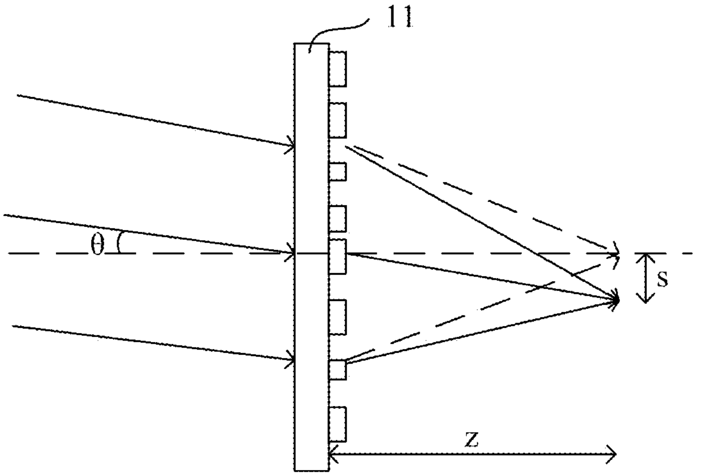
FIG. 5 is a diagram of an imaging position change generated when an angle of an incident ray changes according to an embodiment of this application.

When an incident ray is normal incident from 0° (a corresponding output ray is a dashed line part) to a θ angle (a corresponding output ray is a solid line part), a position of an image changes by s. As shown in FIG. 5, to keep the position of the image unchanged, a pattern of the light splitting unit needs to be moved by −s, that is, a pattern of the light splitting unit corresponding to the θ angle. The movement process is shown in FIG. 6 and FIG. 7.

Figure 6:
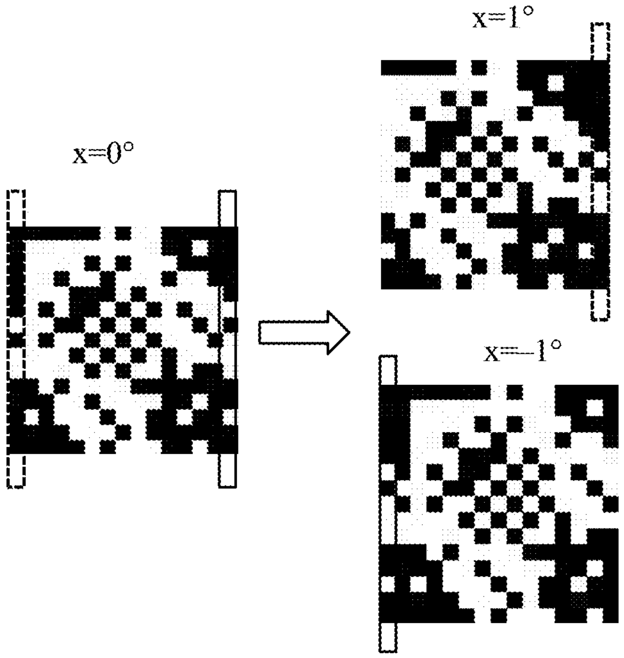
FIG. 6 to FIG. 8 are diagrams of pattern transformation of light splitting units according to an embodiment of this application.

As shown in FIG. 6, if an incident angle of an incident ray changes from 0° (vertical) incidence to +1° incidence along the x direction, a part of a left dashed line of a pattern corresponding to 0° is moved to a right dashed line part of an original pattern, that is, the pattern corresponding to 0° is moved leftward, and a part that exceeds a boundary after the movement is padded to a vacant position on the right side. If the incident angle of the incident ray changes from 0° (vertical) incidence to −1° incidence along the x direction, a part of a right solid line of the pattern corresponding to 0° is moved to a left solid line part of the original pattern.

Figure 7:
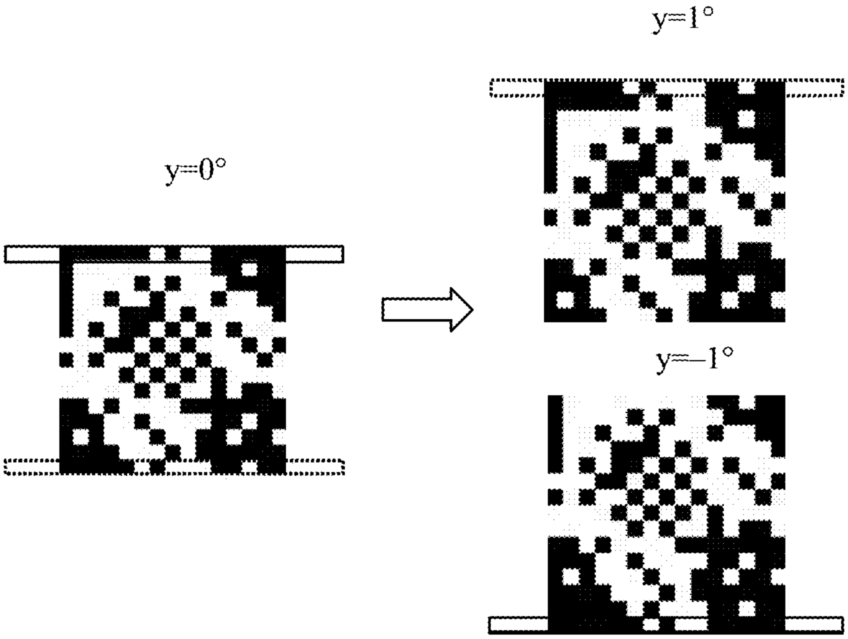

FIG. 7 shows an incident angle of an incident ray from vertical incidence to +1° or −1° incidence along a y direction, and a corresponding pattern changes in the y direction. A change manner is similar to that in FIG. 6, and details are not described herein again.

According to such a position and angle translation relationship, a pattern of a light splitting unit applicable to any incident angle may be constructed. The angle and the moving distance of the pixel herein are merely used as an example, and an actual moving distance is determined by a size of the pixel in the light splitting unit, a refractive index of the light splitting unit, and an incident angle together with the formula (1).

In this embodiment of this application, because the pattern of the light splitting unit includes pixels, a translation distance is usually an integer multiple of a size of a pixel. When a distance calculated based on the formula (1) is not an integer multiple of the size of the pixel, the distance may be approximately an integer multiple of the size of the pixel.

For example, a distance between two adjacent patterns is 1. When a distance between the second light splitting unit 112 and the first light splitting unit 111 is 1, a translation distance for translating the pattern of the first light splitting unit 111 is one row or one column of pixels; when a distance between the second light splitting unit 112 and the first light splitting unit 111 is 2, a translation distance for translating the pattern of the first light splitting unit 111 is two rows or two columns of pixels; or the like.

Herein, an example in which a quantity of rows or columns (value) of translated pixels is equal to the distance between the first light splitting unit 111 and the second light splitting unit 112 is used for description. In another implementation, the two may be different. For example, the quantity of rows or columns of the translated pixels is twice the distance between the first light splitting unit 111 and the second light splitting unit 112, or the two are not in a multiple relationship. For example, when the distance between the second light splitting unit 112 and the first light splitting unit 111 is 1, a translation distance for translating the pattern of the first light splitting unit 111 is three rows or three columns of pixels; when the distance between the second light splitting unit 112 and the first light splitting unit 111 is 2, a translation distance for translating the pattern of the first light splitting unit 111 is five rows or five columns of pixels; or the like.

When the implementation of the foregoing example is used, each light splitting unit 110 is further translated compared with an adjacent light splitting unit 110. Therefore, in one row or one column of light splitting units 110, patterns of any two adjacent light splitting units 110 are different.

For another example, a distance between two adjacent patterns is 1. When the distance between the second light splitting unit 112 and the first light splitting unit 111 is 1, a translation distance for translating the pattern of the first light splitting unit 111 is one row or one column of pixels; when the distance between the second light splitting unit 112 and the first light splitting unit 111 is 2, a translation distance for translating the pattern of the first light splitting unit 111 is one row or one column of pixels; when the distance between the second light splitting unit 112 and the first light splitting unit 111 is 3, a translation distance for translating the pattern of the first light splitting unit 111 is two rows or two columns of pixels; when the distance between the second light splitting unit 112 and the first light splitting unit 111 is 4, a translation distance for translating the pattern of the first light splitting unit 111 is two rows or one column of pixels; or the like.

In this implementation, consecutive light splitting units use a same translation distance, and patterns obtained by using the same translation distance are the same. That is, a plurality of light splitting units are arranged in an array, one row or one column of light splitting units are divided into a plurality of groups, each group includes a plurality of light splitting units that are consecutively arranged, and patterns of the plurality of light splitting units that are consecutively arranged are the same.

Figure 8:
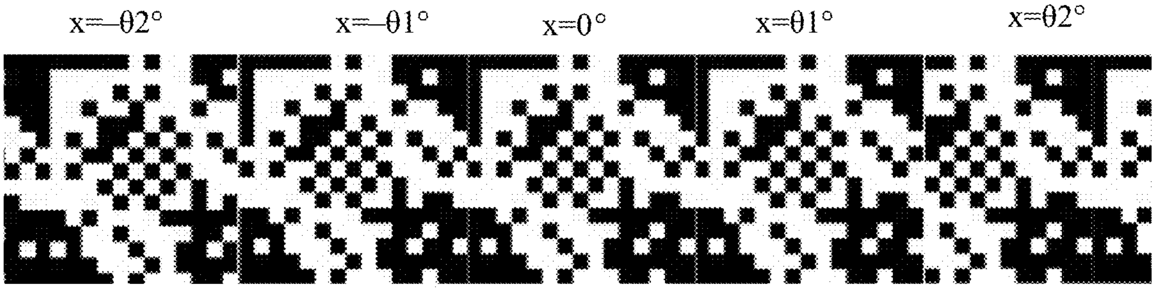

Herein, when a large-area two-dimensional metasurface layer is generated, an angle range (also referred to as an angular bandwidth) covered by each pattern can be used to further reduce structural complexity and improve production efficiency. Because the angular bandwidth exists, when an angle of an incident ray changes quite small, a pattern of a corresponding light splitting unit does not need to be changed each time. As shown in FIG. 8, when the angle of the incident ray changes from x=0° to x=±θ1°, the pattern of the corresponding light splitting unit may be directly used when x=0°. When the angle of the incident ray exceeds the angular bandwidth, for example, when the angle of the incident ray changes to x=±θ2, then, a pattern obtained by moving x=0°, to obtain a new pattern. The same method is also applicable to the y direction. In this way, structure complexity of the metasurface layer can be reduced again without affecting performance of the metasurface layer, and because there is a same pattern, a design and processing process is further simplified.

An example in which the plurality of light splitting units at the metasurface layer are arranged in an array is used. In another embodiment, the light splitting units may not be arranged in an array. This is not limited in this application.

In this embodiment of this application, the first metasurface layer 11 is a micro-nano structure formed by two materials with different refractive indexes. The micro-nano structure is a sub-wavelength micro-nano plane structure with special electromagnetic properties, can be made by using a micro-nano preparation technology, and is easy to mass production. The first metasurface layer 11 is of a two-dimensional structure, has a compact structure, and can be combined with a current CMOS technology. Therefore, a compact large-area metasurface layer that matches the CMOS (for example, a field of view (field of view, FOV) and a size) is designed, so that the compact large-area metasurface layer is easily integrated into a module of a camera or a mobile phone. In addition, compared with an image sensor implemented by using a Bayer light filter in a related technology, light flux can be improved, thereby improving imaging quality.

FIG. 8 is used as an example. A black part is a material with a high refractive index, for example, titanium oxide, and a white part is a material with a low refractive index, for example, air. The black part may also be referred to as a micro-nano unit element, and the white part may also be referred to as a substrate. Distribution of the two parts forms the foregoing mosaic pattern.

Certainly, the material herein is not limited to the foregoing two types. The material of the black part and the material of the white part may be selected from the following types: titanium oxide, silicon nitride, silicon oxide, silicon, metal, and the like. However, it needs to be ensured that a refractive index of the material of the black part is higher than a refractive index of the material of the white part.

Figure 9:
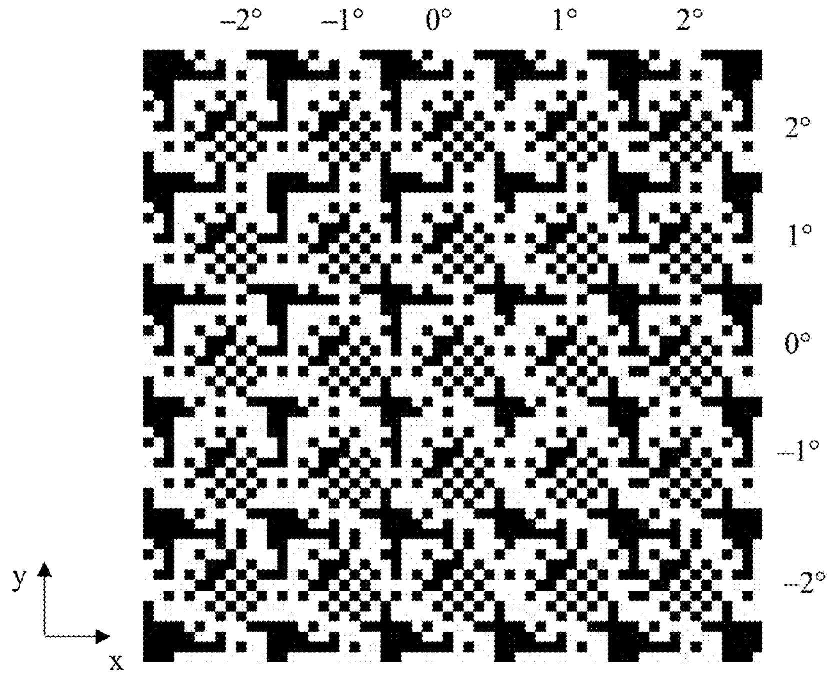
FIG. 9 is a diagram of a pattern of a large-area metasurface layer according to an embodiment of this application.

FIG. 9 is a diagram of a pattern of a large-area metasurface layer according to an embodiment of this application. FIG. 9 is a diagram of a metasurface layer with a designed 5×5 mosaic pattern. A corresponding incident ray is irradiated in a range of −5° to 5° in an x direction and in a range of −5° to 5° in a y direction. The 5×5 mosaic pattern corresponds to 5×5 light splitting units, and precision of an incident ray corresponding to each light splitting unit is 1°. Certainly, using 1° as precision is merely an example. In the metasurface layer structure corresponding to FIG. 9 and other accompanying drawings, the precision of the incident ray corresponding to each light splitting unit may not be 1°, for example, may be smaller or larger. The following describes how to design a pattern of a metasurface layer with reference to FIG. 9.

The pattern of the light splitting unit provided in this application is distributed in a mosaic pattern. In a condition of normal incidence (that is, an incident angle of an incident ray is) 0°, the pattern of the first light splitting unit 111 is obtained through optimization by using a reverse design algorithm, that is, a pattern in the middle of FIG. 9. Then, a pattern of a light splitting unit 110 corresponding to any incident angle is obtained through transformation by using a relative position relationship between the mosaic pattern and an angle of an incident ray, that is, a pattern around the pattern in the middle of FIG. 9. The pattern obtained through transformation can ensure relatively good diffraction efficiency of an incident ray in the region, thereby ensuring a light splitting effect. Finally, patterns corresponding to different angles are spliced in a two-dimensional direction based on a position relationship, to obtain the pattern of the metasurface layer shown in FIG. 9.

The metasurface layer provided in this application can implement a large-area color separation function, and various colors in an incident ray are separated at a detection layer and refocused in a corresponding region.

In other words, the metasurface layer provided in this embodiment of this application can implement color separation of light at any incident angle, thereby improving light utilization efficiency. The following analyzes spectrum and light intensity distribution of the metasurface layer designed in this embodiment of this application, to describe a light splitting effect of the metasurface layer.

Figure 10:
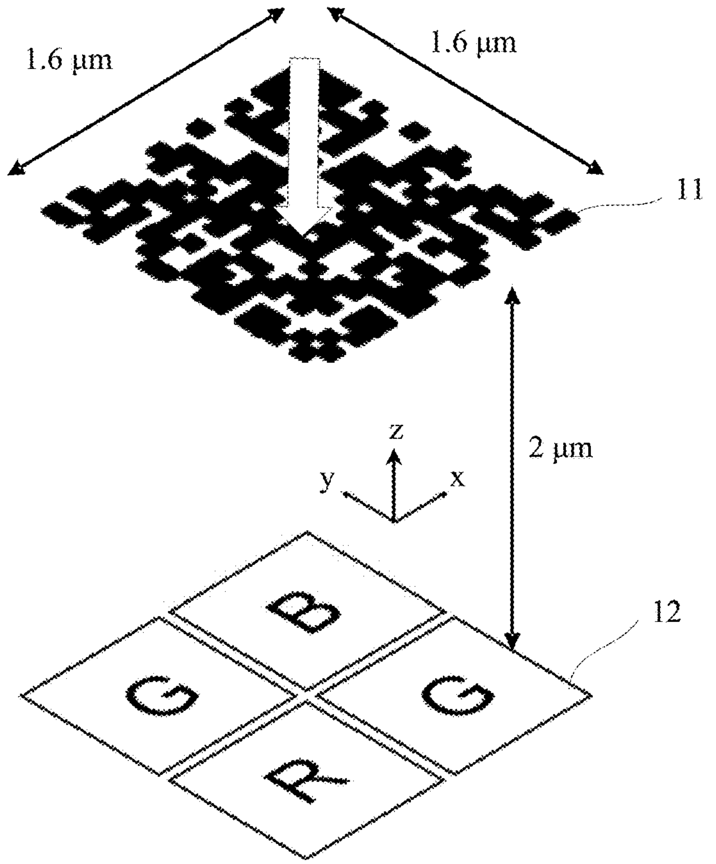
FIG. 10 is a diagram of a relationship between a metasurface layer and a detection layer according to an embodiment of this application.

A metasurface layer with a light splitting unit having a 2×2 light splitting effect is used as an example, as shown in FIG. 10. A size of a pattern of the light splitting unit is 1.6 μm×1.6 μm, a thickness is 300 nm, the pattern includes 400 (20×20) pixels, and each pixel may be titanium dioxide ($TiO_2$) or air. In the figure, a hollow arrow indicates an incident direction of an incident ray with an incident angle of 0°, and a wavelength range of the incident ray is 400 nm to 700 nm, that is, the incident ray is visible light. At a position 2 μm below the light splitting unit, a CMOS detection region having four detection sub-regions G, B, R, and G is disposed. The four detection sub-regions are respectively used to detect average transmittances $T_{G1}$, $T_R$, $T_B$, and $T_{G2}$ of green light (500 nm to 600 nm), blue light (400 nm to 500 nm), red light (600 nm to 700 nm), and green light (500 nm to 600 nm). An average value of $T_R$, $T_G$ ($T_G=T_{G1}+T_{G2}$), and $T_B$ is splitting efficiency of the light splitting unit.

Figure 11:
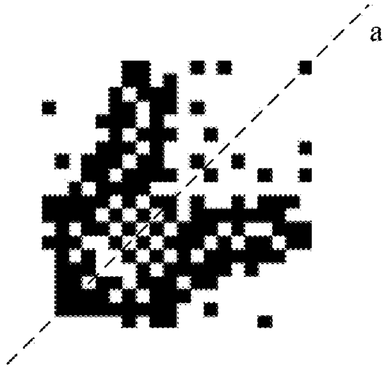
FIG. 11 is a diagram of a pattern of a light splitting unit according to an embodiment of this application.

Herein, the four detection sub-regions G, B, R, and G of the CMOS detection region are 45° diagonally symmetric. Therefore, a 45° diagonally symmetric structure may also be used for designing the light splitting unit. For example, as shown in FIG. 11, a diagonal a is used as an axis, and patterns on two sides are the same. In this way, only a half of the patterns need to be designed during designing, and then the other half can be obtained. This can greatly reduce a quantity of solutions in a reverse design optimization process, and accelerate an optimization searching process. The reverse design optimization process is a process in which a pattern of the first light splitting unit is determined by using a particle swarm algorithm, a simulated annealing algorithm, or the like, light splitting is performed by using the designed pattern, and the designed pattern is optimized based on an actual effect of light splitting, to finally obtain a pattern of the first light splitting unit that meets a condition.

Figure 12:
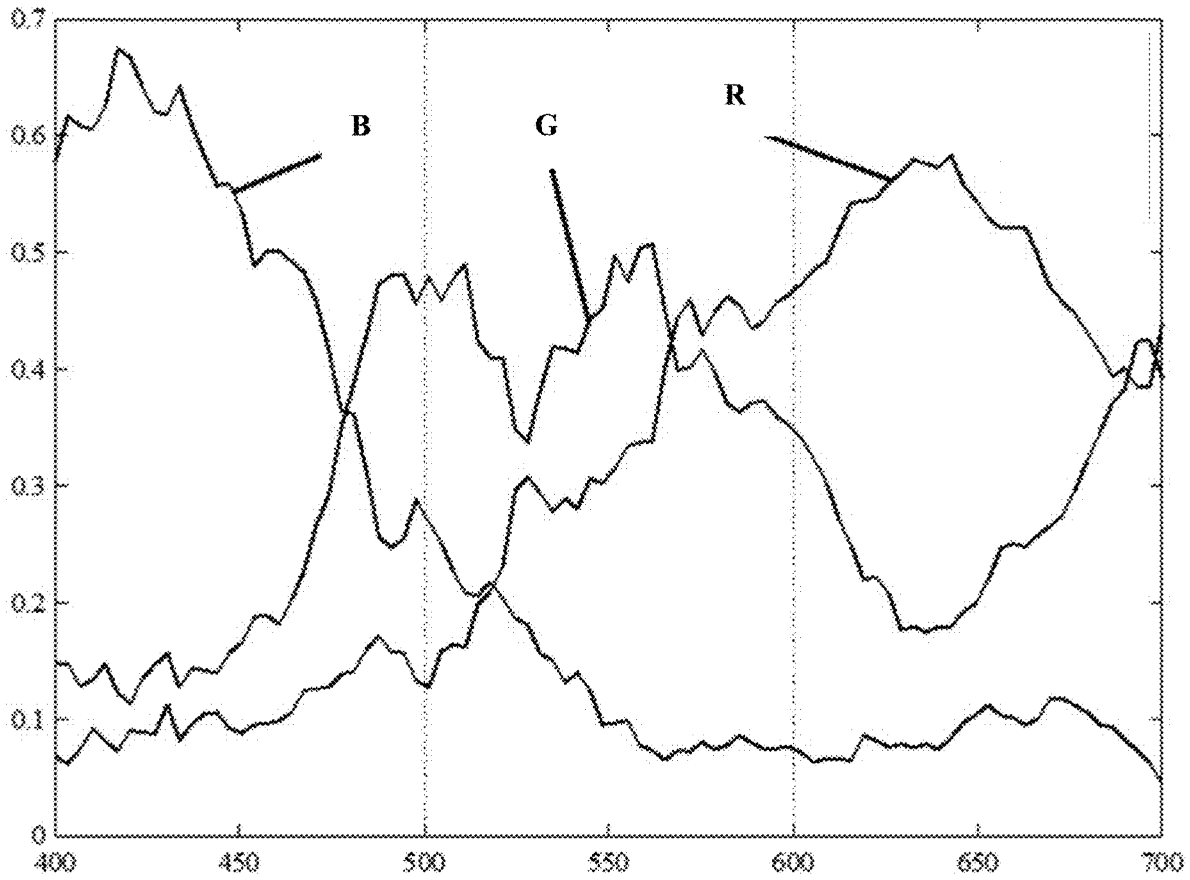
FIG. 12 is a diagram of an analog spectrum obtained when an incident ray is vertically incident to a first light splitting unit according to an embodiment of this application.

FIG. 12 is an analog spectrum diagram obtained when an incident ray is vertically incident to the first light splitting unit shown in FIG. 11 according to an embodiment of this application. In the spectrum diagram, a horizontal coordinate is a wavelength, a unit is nm, and a vertical coordinate is a transmittance. Three curves R, G, and B respectively show transmittances of an entire visible light band in R, G (G=G1+G2), and B detection sub-regions. It can be learned that, in the R detection sub-region, a transmittance of a red light band (600 nm to 700 nm) is higher than that of another band, and the transmittance $T_R$ of the red light band is 49.9% (that is, corresponding to 0.499 in the figure). The transmittance herein is an average transmittance of the 600 nm to 700 nm band. In the G detection sub-region, a transmittance of the green light band (500 nm to 600 nm) is higher than that of another band, the transmittance $T_G$ of the green light band is 42.0% (where $T_{G1}$ is 19.5% and $T_{G2}$ is 22.5%). In the detection sub-region B, a transmittance of a blue light band (400 nm to 500 nm) is higher than that of another band, and the transmittance $T_B$ of the blue light band is 50.6% which is much higher than that of $T_R$ and $T_G$. This indicates that the light splitting unit has the highest efficiency in color separation for blue light. Based on $T_R$, $T_G$, and $T_B$, in the case of vertical incidence, the splitting efficiency of the light splitting unit obtained through calculation is 47.5%.

Figure 13:
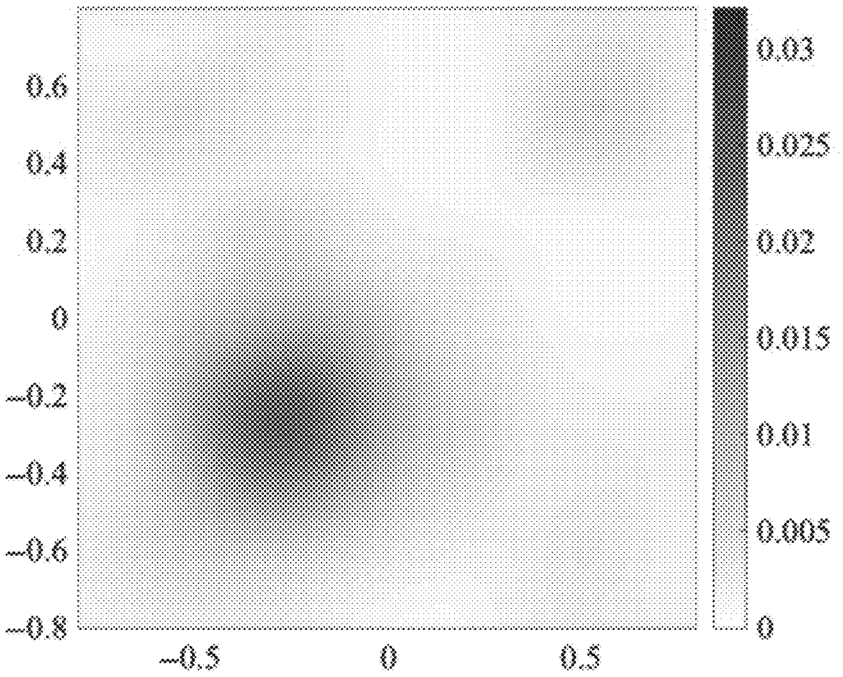
FIG. 13 to FIG. 15 are diagrams of light intensity distribution of red, green, and blue colors in a detection subregion according to an embodiment of this application.
Figure 14:
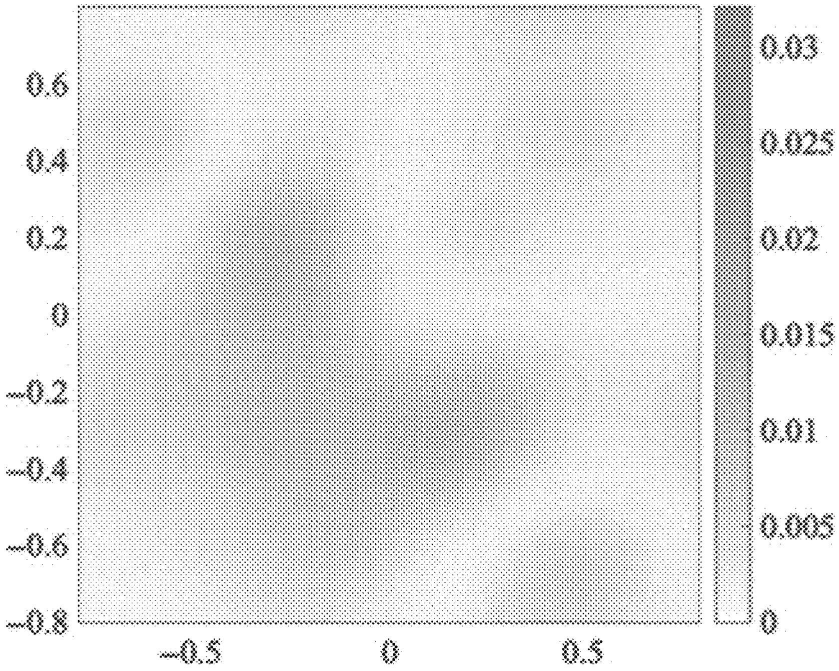
Figure 15:
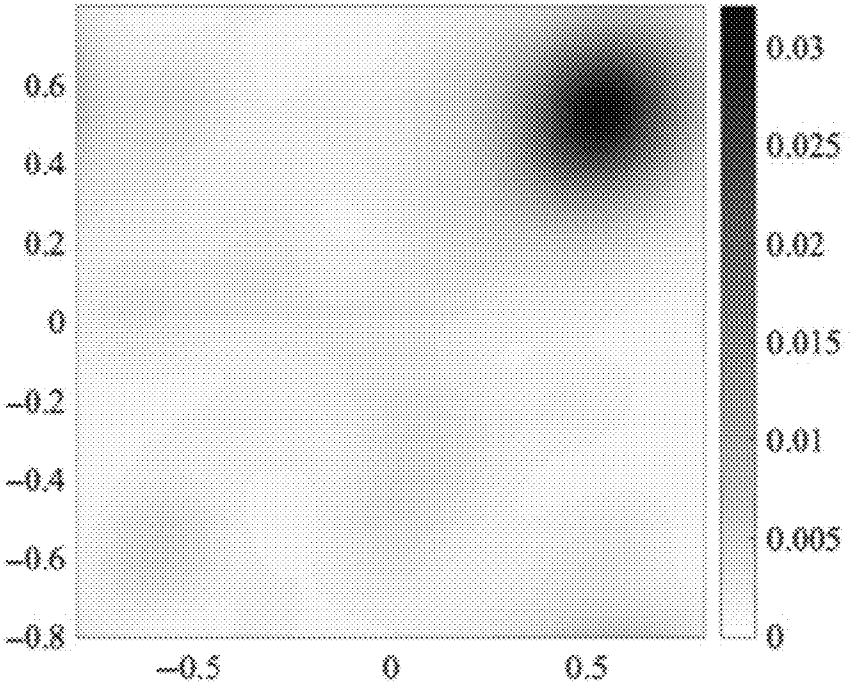
Figure 16:
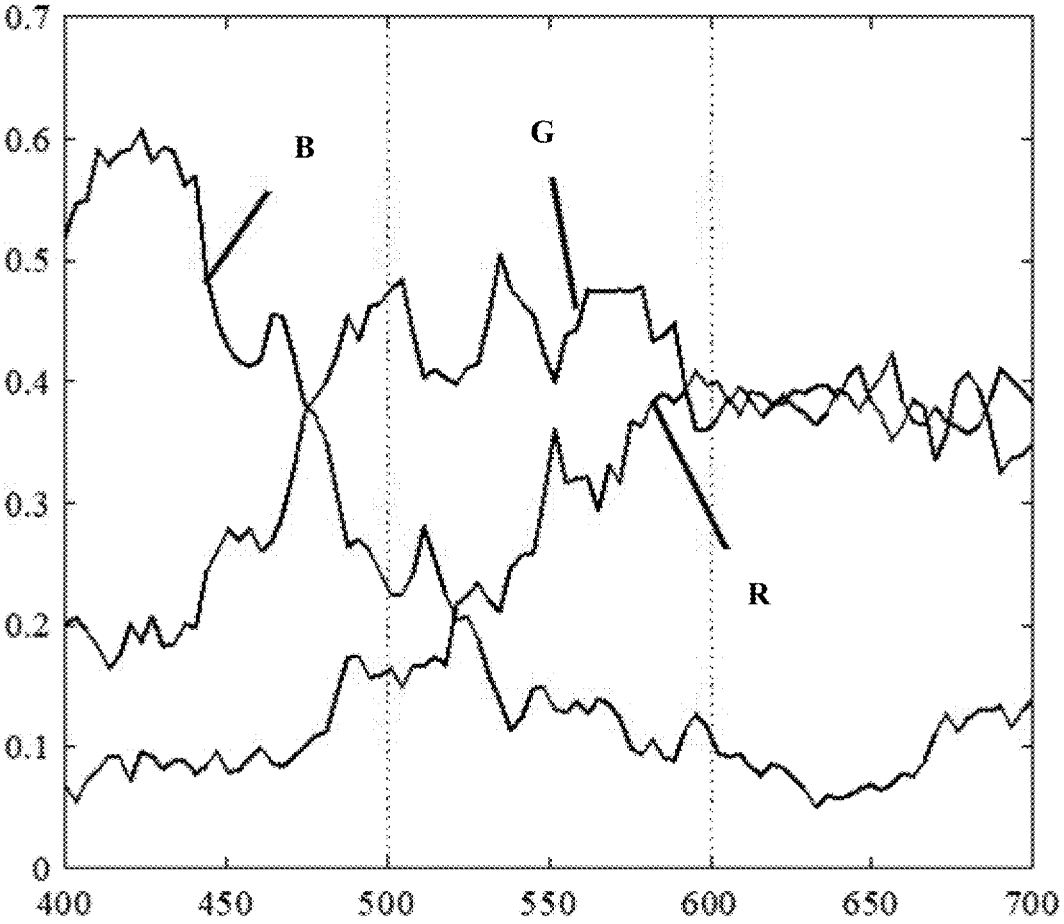
FIG. 16 to FIG. 21 are diagrams of an analog spectrum obtained when an incident ray is incident to a first light splitting unit at different angles according to an embodiment of this application.
Figure 17:
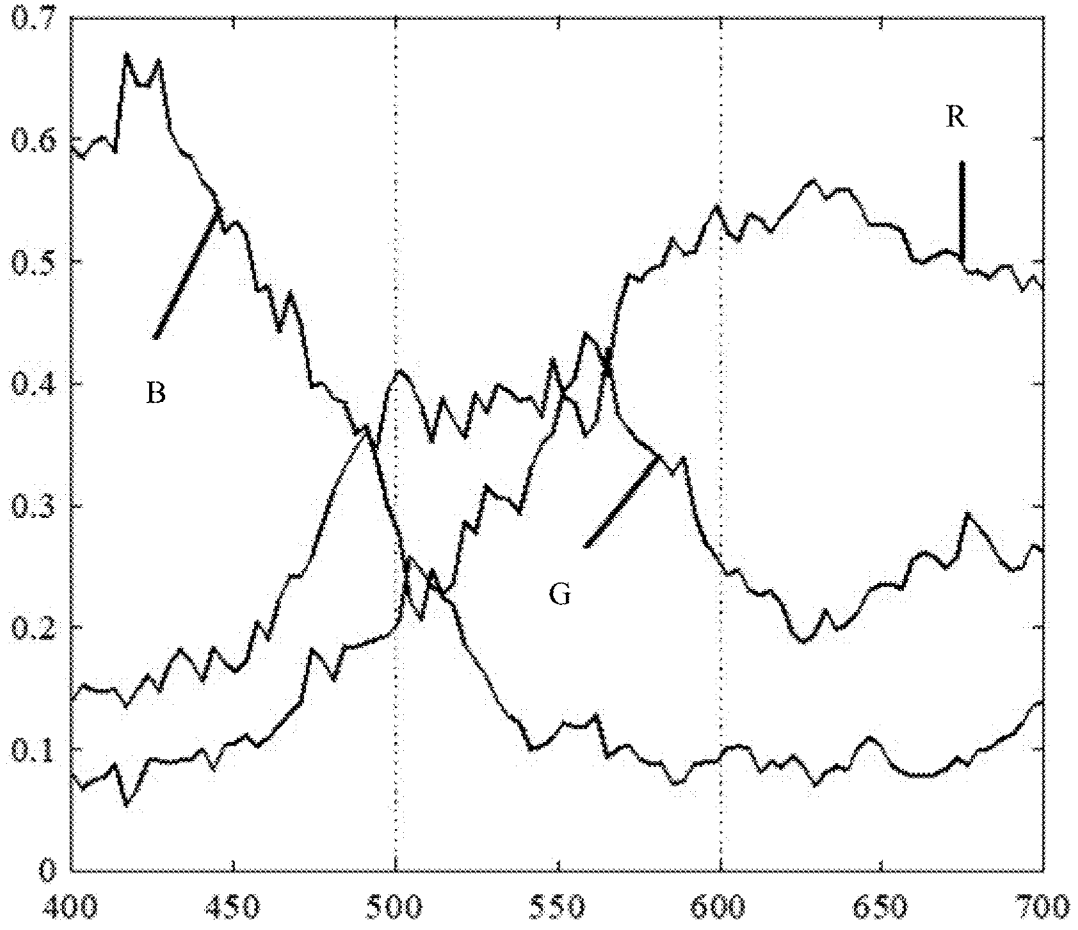
Figure 18:
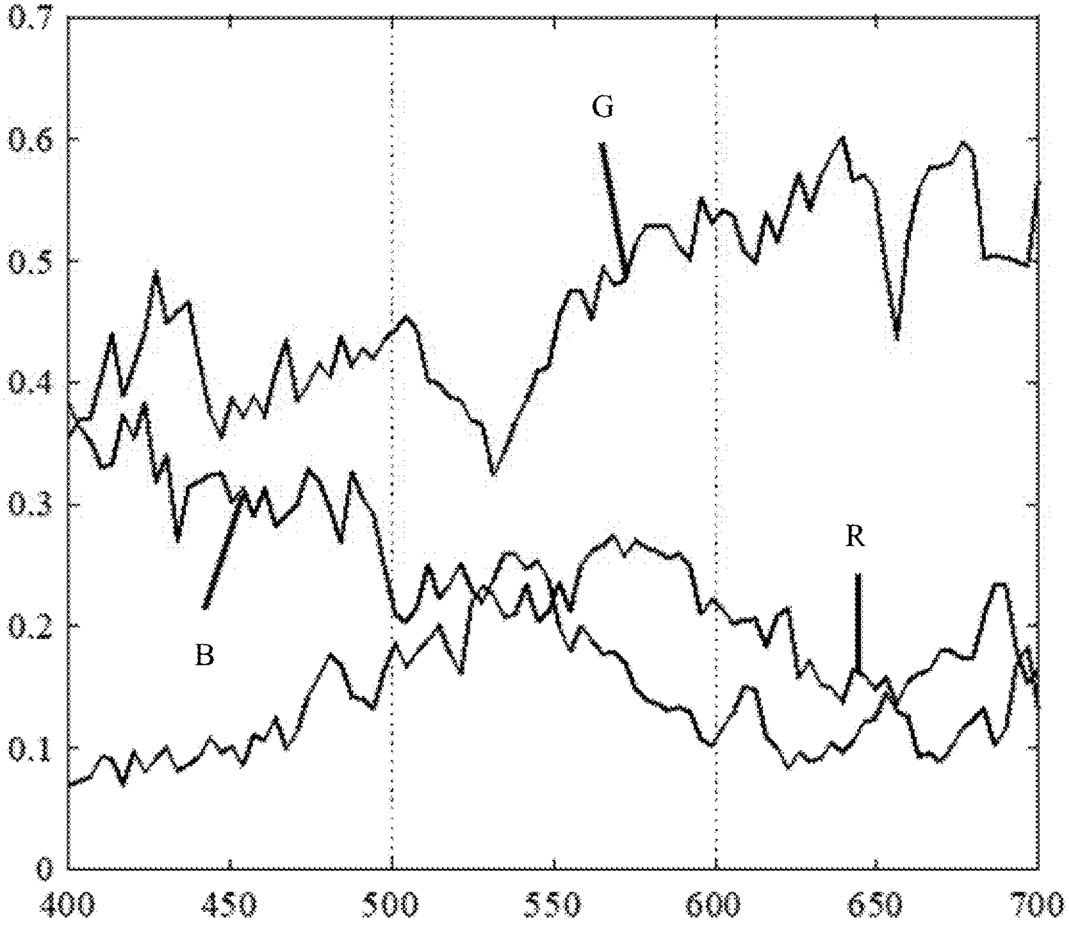
Figure 19:
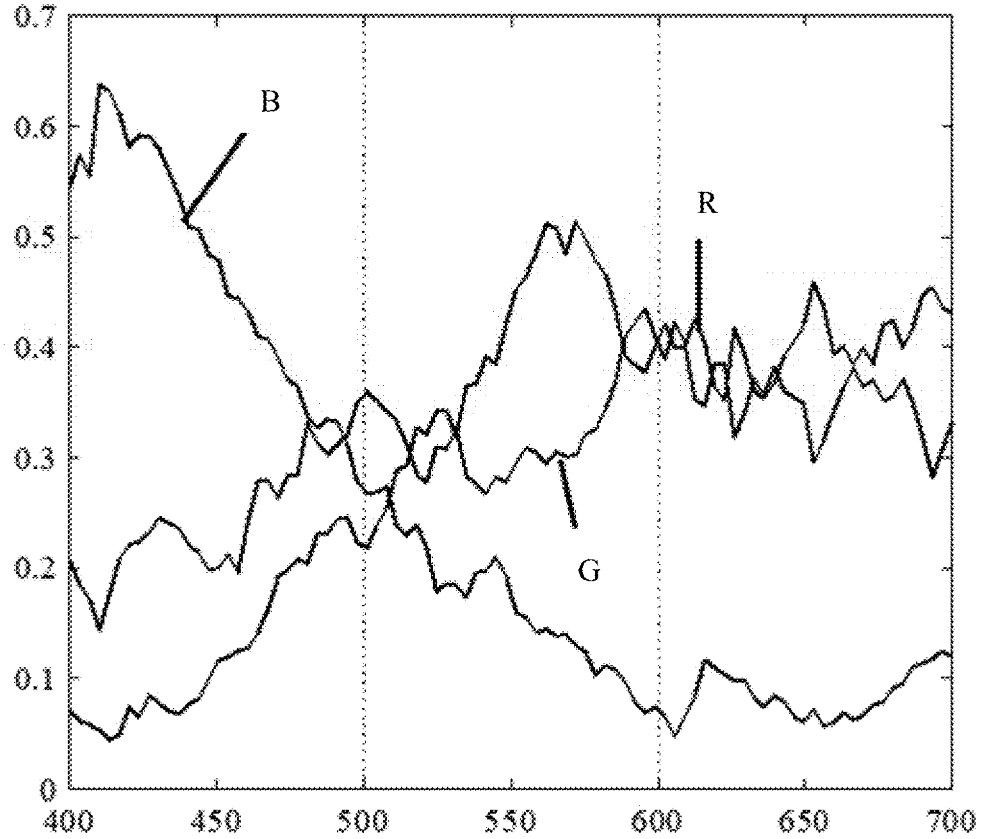
Figure 20:
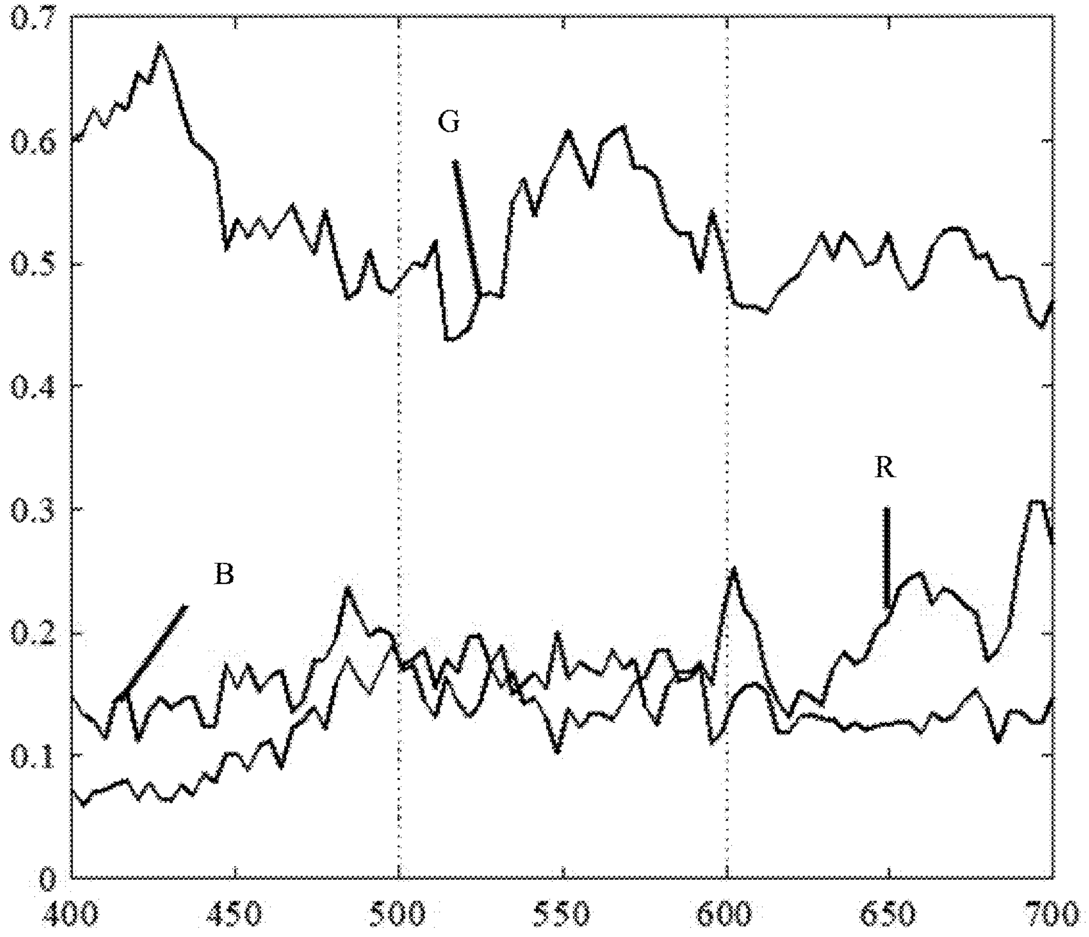
Figure 21:
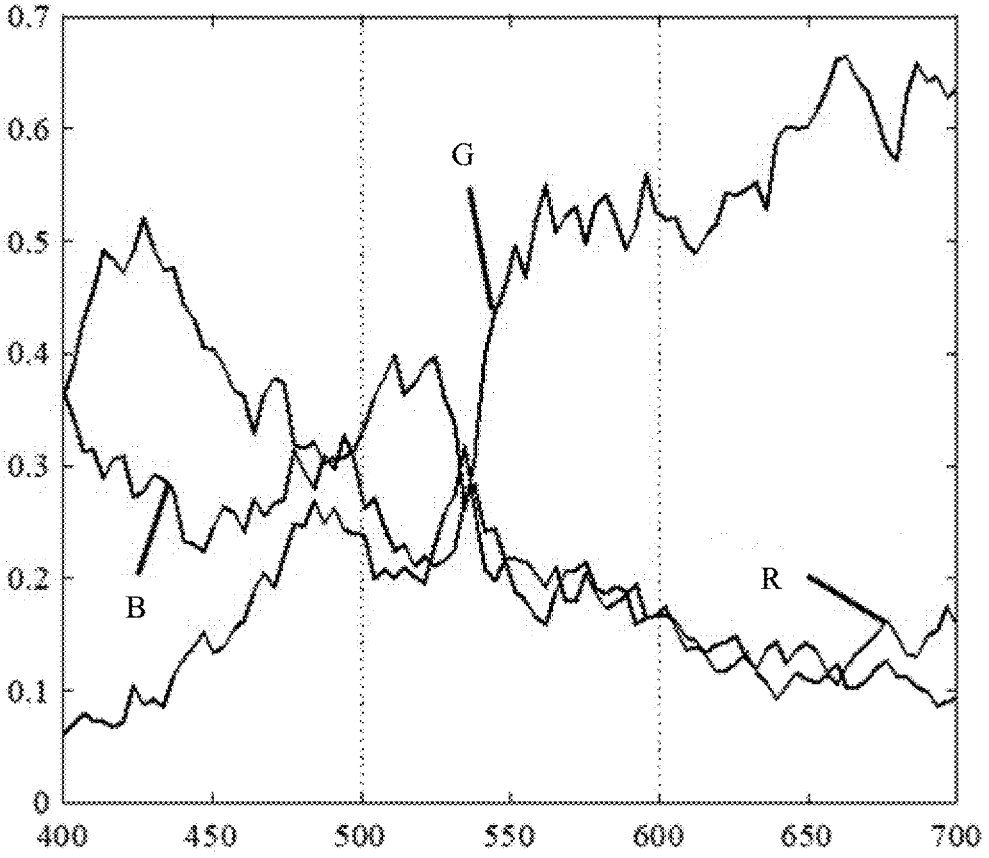
Figure 22:
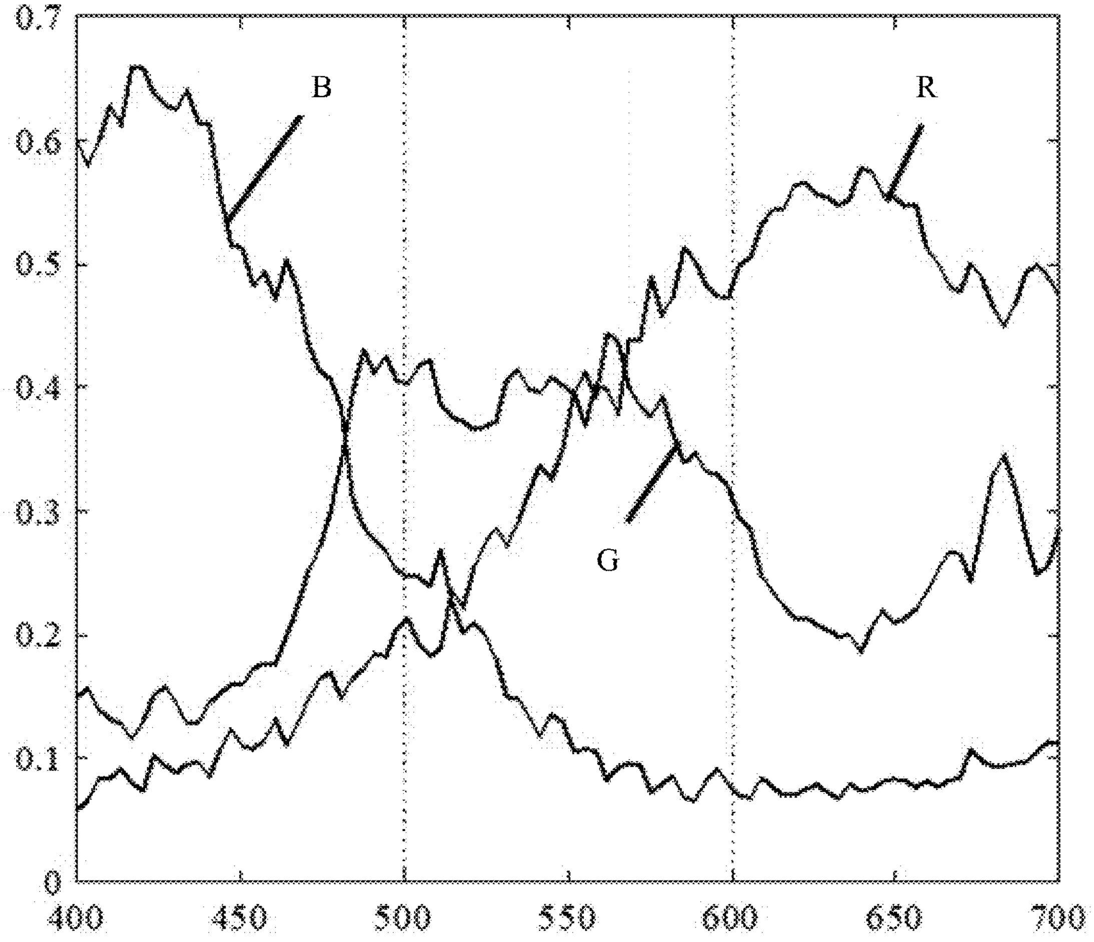
FIG. 22 to FIG. 27 are diagrams of an analog spectrum obtained when an incident ray is incident to a second light splitting unit at different angles according to an embodiment of this application.
Figure 23:
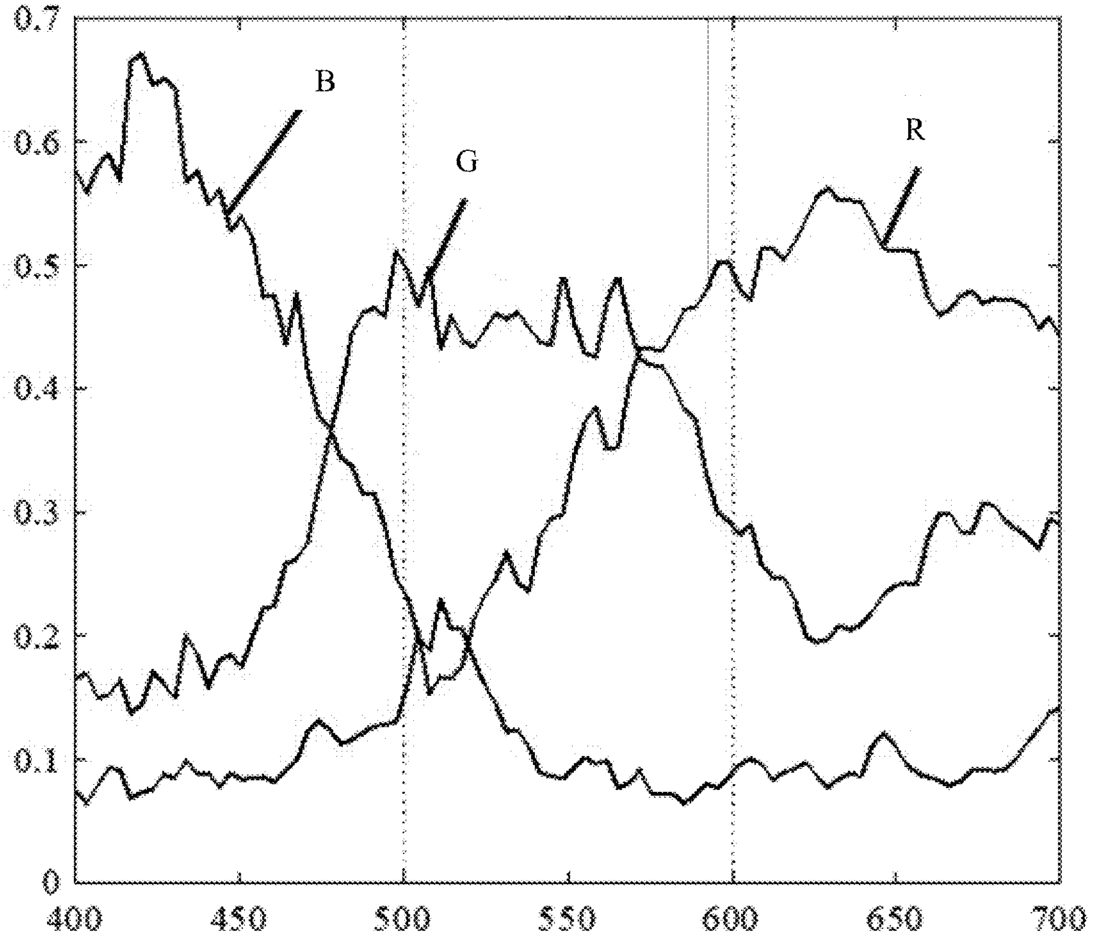
Figure 24:
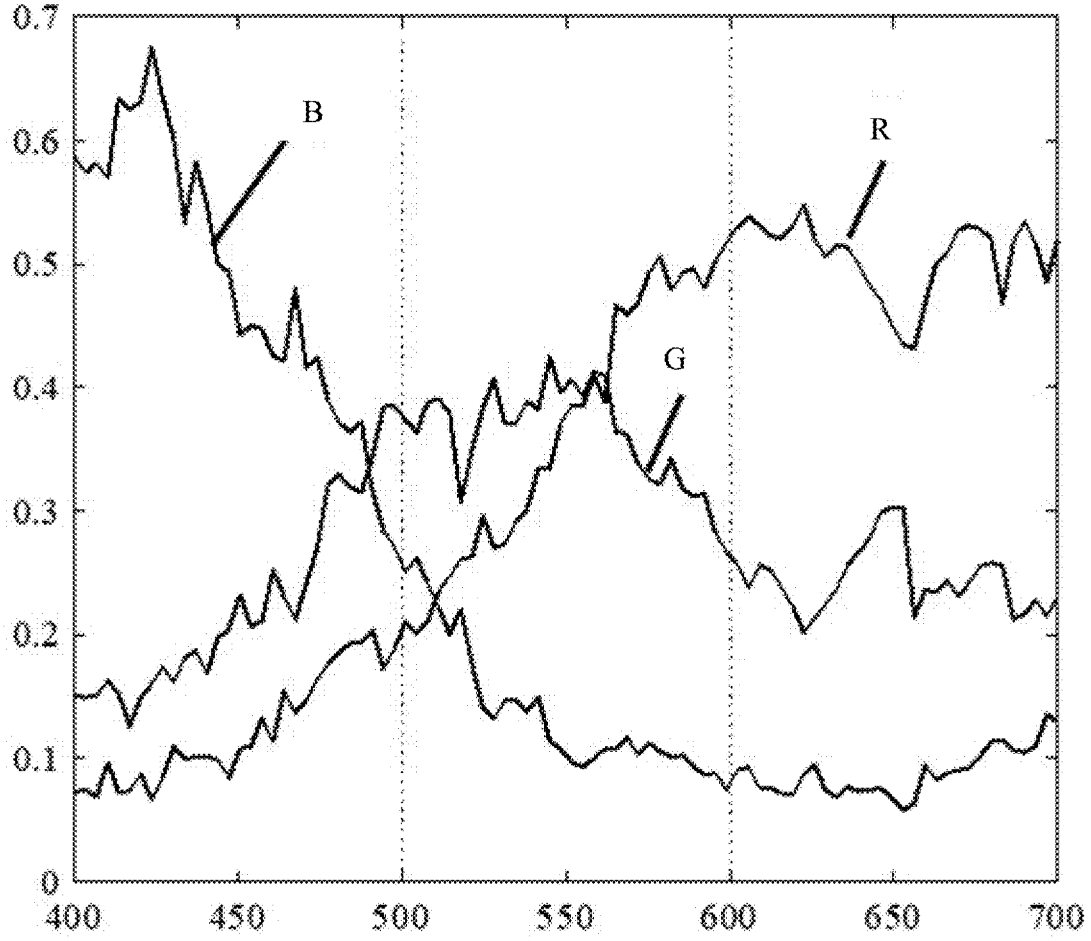
Figure 25:
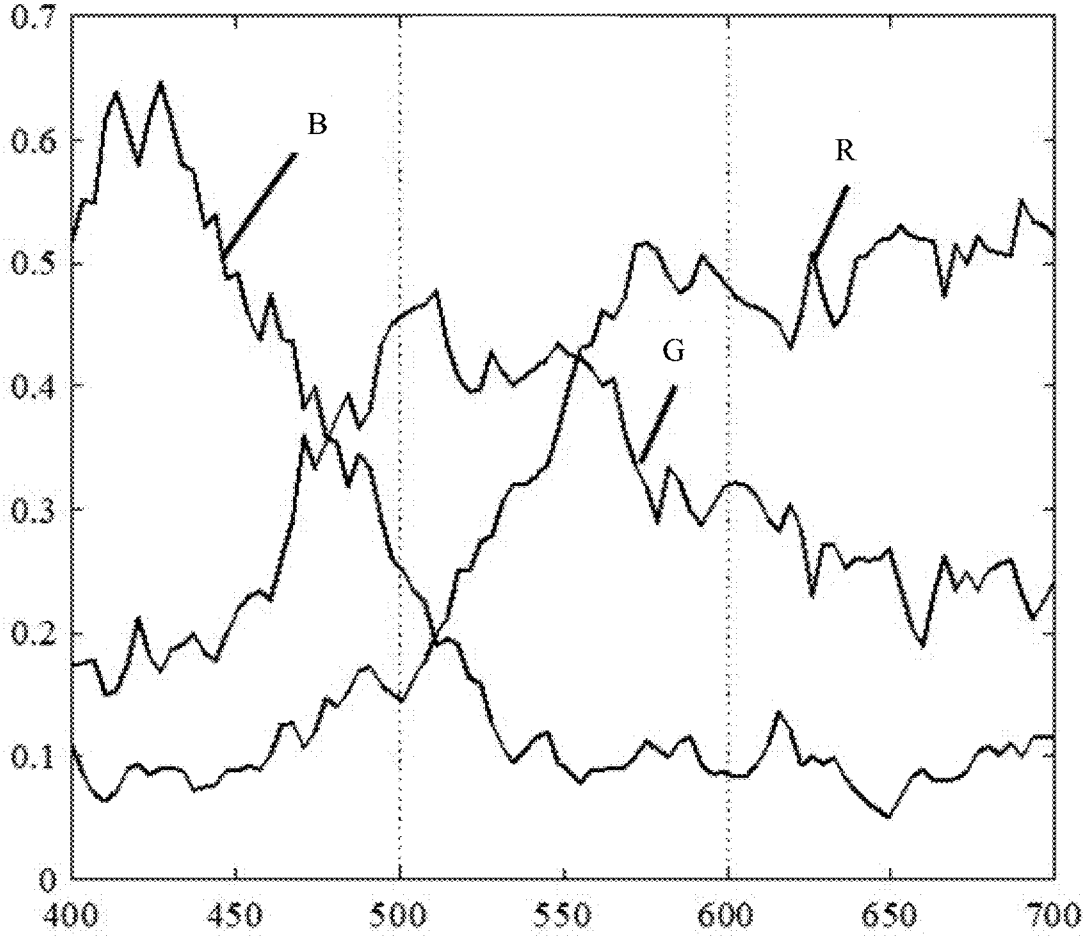
Figure 26:
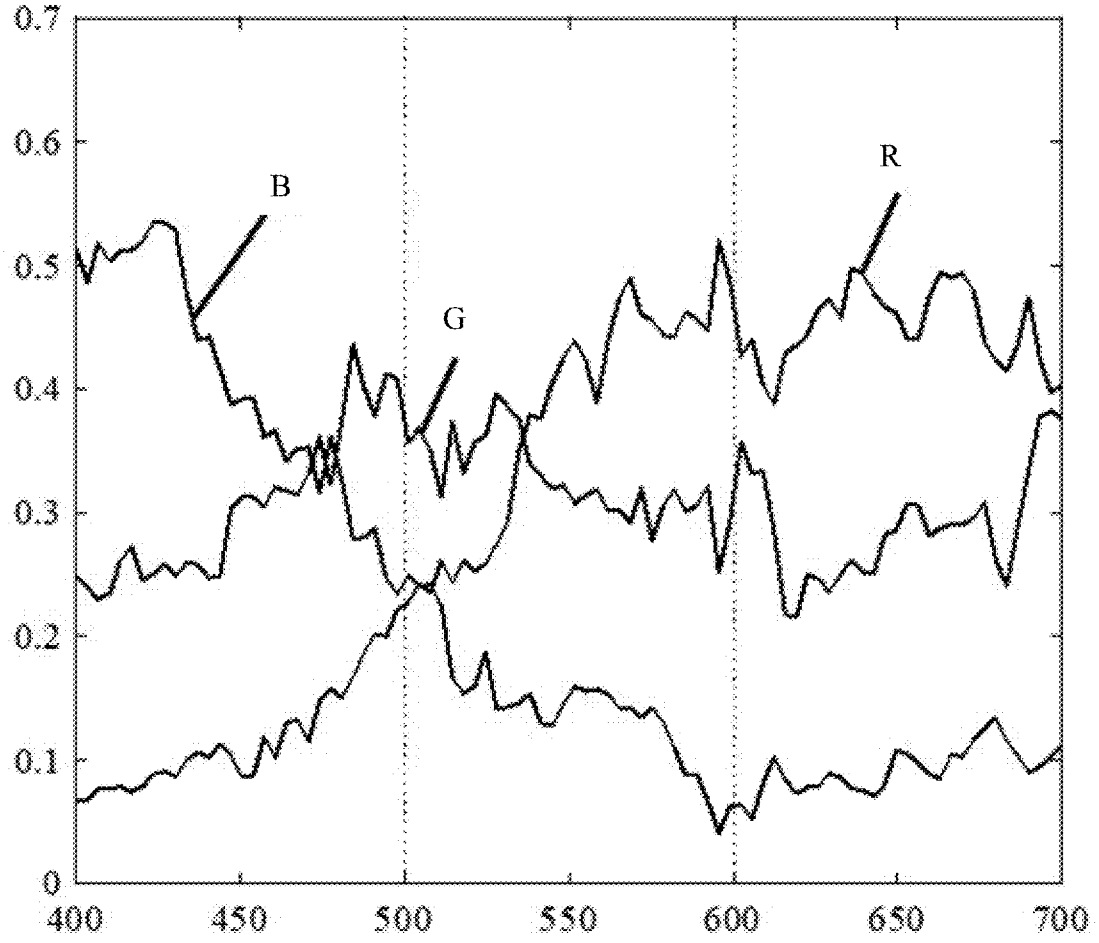
Figure 27:
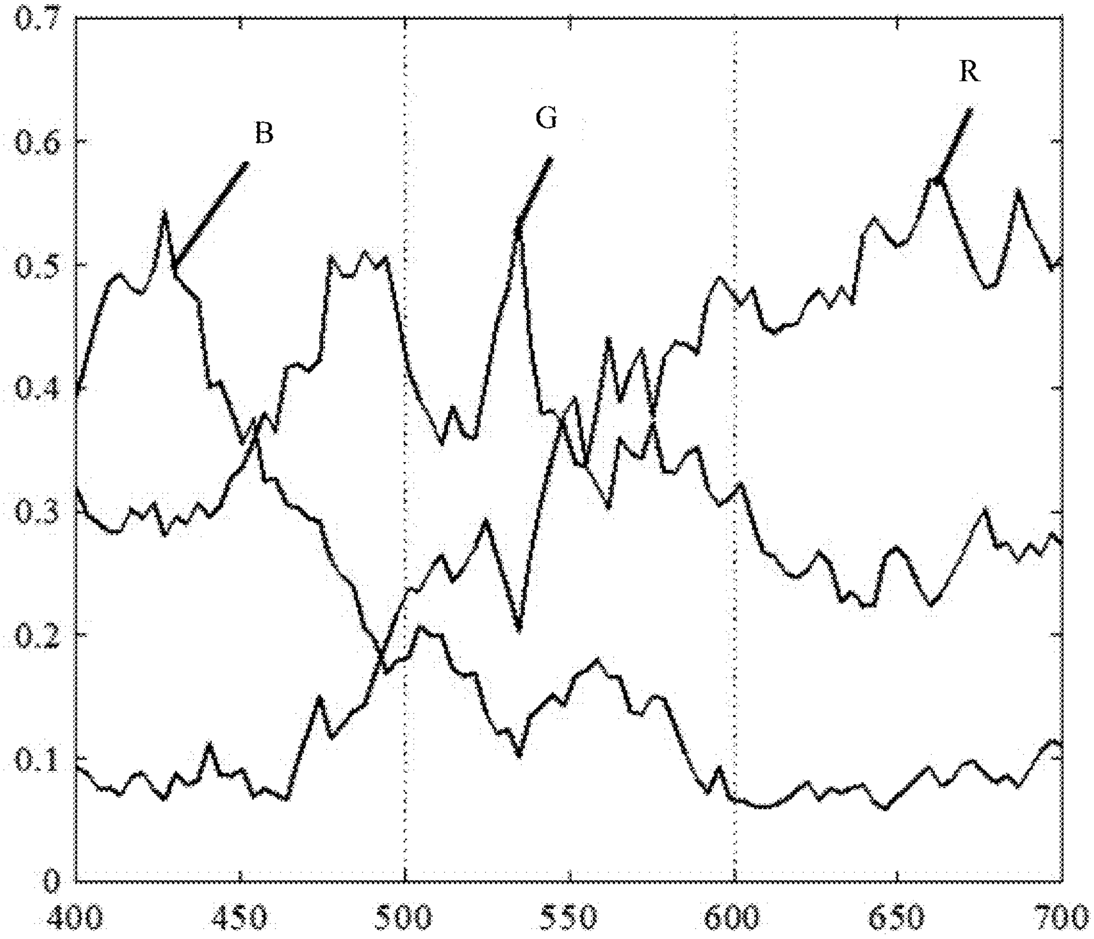

FIG. 13 to FIG. 15 are light intensity distribution diagrams obtained when an incident ray is vertically incident to the first light splitting unit shown in FIG. 11 according to this embodiment of this application. The light intensity distribution diagrams shown in FIG. 13 to FIG. 15 respectively show light intensity distribution statuses of red, green, and blue colors in the entire detection region. As shown in FIG. 13, after passing through the light splitting unit, the red light band is mostly imaged in the lower left corner in the R detection sub-region, and light spots are relatively concentrated. As shown in FIG. 14, after passing through the light splitting unit, the green light band is mainly imaged in the upper left corner in the G region and the lower right corner in the G region, light spots are relatively scattered, and obvious diagonal symmetrical distribution is presented. As shown in FIG. 15, after the blue light band passes through the light splitting unit, a quite large part of the blue light band is imaged in the upper right corner in the region B, and light spots are most obvious. In FIG. 13 to FIG. 15, a horizontal coordinate and a vertical coordinate represent a size of a detection region, and color brightness in the region represents a detected light intensity of a corresponding color.

The first light splitting unit in FIG. 11 is used to perform light splitting on incident rays at other incident angles, and angle sensitivity of the first light splitting unit is analyzed, to obtain analog spectra obtained when incident rays shown in FIG. 16 to FIG. 21 are incident to the first light splitting unit at different incident angles. As shown in FIG. 16 to FIG. 21, when the incident angles of the incident rays are respectively −2° (FIG. 16), 2° (FIG. 17), −5° (FIG. 18), 5° (FIG. 19), −10° (FIG. 20), and 10° (FIG. 21), based on the same calculation method for vertical incidence, it can be calculated that color separation efficiency of the light splitting unit is respectively 42.8%, 46.5%, 31.4%, 40.1%, 30.0% and 29.0%, indicating that the light splitting unit is sensitive to an angle. In addition, a larger tilt angle of the incident ray indicates lower light splitting efficiency.

A pattern of a second light splitting unit corresponding to an incident ray at each incident angle is generated by using the pattern of the first light splitting unit in FIG. 11, and light splitting is performed by using the second light splitting unit corresponding to the incident ray at each incident angle, to obtain analog spectrum diagrams obtained when incident rays shown in FIG. 22 to FIG. 27 are incident to a corresponding second light splitting unit at different angles. As shown in FIG. 22 to FIG. 27, when the incident angles of the incident rays are −2° (FIG. 22), 2° (FIG. 23), −5° (FIG. 24), 5° (FIG. 25), −10° (FIG. 26), and 10° (FIG. 27), light splitting efficiency of the second light splitting unit corresponding to the incident rays at the incident angles is respectively 47.0%, 47.5%, 45.2%, 45.5%, 39.4% and 41.2%, which is obviously improved compared with the light splitting efficiency in FIG. 16 to FIG. 21. In addition, an analog spectrum diagram at each incident angle is similar to the analog spectrum diagram of vertical incidence in FIG. 12, indicating that the method for obtaining the pattern of the second light splitting unit by translating the pattern of the first light splitting unit provided in this embodiment of this application has a good light splitting effect.

In this embodiment of this application, the light splitting unit 110 at the first metasurface layer 11 may split the incident rays into red (red, R) light, green (green, G) light, and blue (blue, B) light.

In addition to performing light splitting based on RGB, the first metasurface layer 11 may further perform light splitting based on red, yellow, and blue (red yellow blue, RYB), or based on red, green, blue, and emerald (red green blue emerald, RGBE), or based on cyan yellow and green magenta (cyan yellow green magenta, CYGM).

In this embodiment of this application, in addition to performing separation on colors of light, the first metasurface layer 11 may further split the light into different polarizations. In other words, the first metasurface layer 11 is further configured to split a corresponding incident ray into light of a plurality of polarizations. Correspondingly, the detection layer 12 is configured to receive a plurality of types of light output by the first metasurface layer 11, convert the plurality of types of received light into electrical signals. Any two types of light in the plurality of types of light are different in at least one of color and polarization.

Different from a conventional polarizer that directly filters out irrelevant polarization state information, the metasurface layer in this application extracts all polarization information. In this way, more polarization information is obtained, thereby improving final imaging efficiency. The metasurface layer in this application can not only separate and converge colors of light, but also separate polarization states, so as to provide more imaging information and expand an application scenario of an imaging system.

For example, the light splitting unit 110 at the first metasurface layer 11 splits an incident ray into light of three colors: R, G, and B, and the light splitting unit 110 splits the incident ray into horizontal polarized light and vertical polarized light. In this case, the actual light splitting unit 110 splits the incident ray into six beams of light, which are respectively red horizontal polarized light, green horizontal polarized light, blue horizontal polarized light, red vertical polarized light, green vertical polarized light, and blue vertical polarized light.

In addition to being divided into two orthogonal polarizations: a horizontal polarization and a vertical polarization, polarizations can be divided into four basic polarization states (0°, 45°, 90°, and) 135°, or be divided into a linear polarization and a circular polarization.

Any one of the foregoing polarization division manners and any one of the foregoing color division manners may be combined. For example, if colors are divided based on CYGM, and polarizations are divided based on an orthogonal polarization manner, the light splitting unit 110 splits an incident ray into eight beams of light, which are respectively C-color horizontal polarized light, Y-color horizontal polarized light, G-color horizontal polarized light, M-color horizontal polarized light, C-color vertical polarized light, Y-color vertical polarized light, G-color vertical polarized light, and M-color horizontal polarized light.

Figure 28:
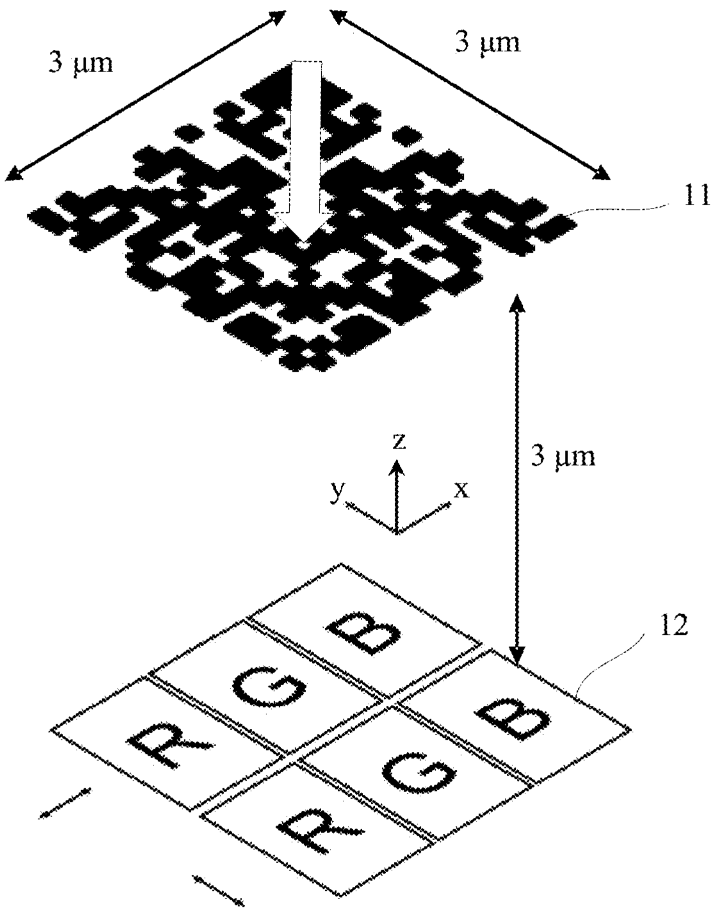
FIG. 28 is a diagram of a relationship between a metasurface layer and a detection layer according to an embodiment of this application.

A pattern of the light splitting unit at the metasurface layer is asymmetrical and random, and may cause different color separation responses to light of different polarizations. By using this feature, a light splitting unit having a polarization division function can be obtained. As shown in FIG. 28, for example, a size of a light splitting unit is 3 μm×3 μm, a thickness of the light splitting unit is 300 nm, and the light splitting unit includes 900 (30×30) pixels. Each pixel may be titanium dioxide (TiO2), or may be air. The incident ray is vertically incident to the light splitting unit from a normal direction (0°) of the light splitting unit. The incident ray is visible light with a wavelength ranging from 400 nm to 700 nm. At a position 3 μm below the metasurface layer, a CMOS detection region having six detection sub-regions is disposed. The six detection sub-regions are respectively R, R, G, G, B, and B, and are respectively used to monitor average transmittances $T_{R1}$, $T_{R2}$, $T_{G1}$, $T_{G2}$, $T_{B1}$, and $T_{B2}$ of a red (600 nm to 700 nm) band, a green (500 nm to 600 nm) band, and a blue (400 nm to 500 nm) band in a horizontal polarization and a vertical polarization. An average value of $T_{R1}$, $T_{G1}$, and $T_{B1}$ is light splitting efficiency of the light splitting unit in the horizontal polarization, and an average value of $T_{R2}$, $T_{G2}$, and $T_{B2}$ is light splitting efficiency of the light splitting unit in the vertical polarization.

Figure 29:
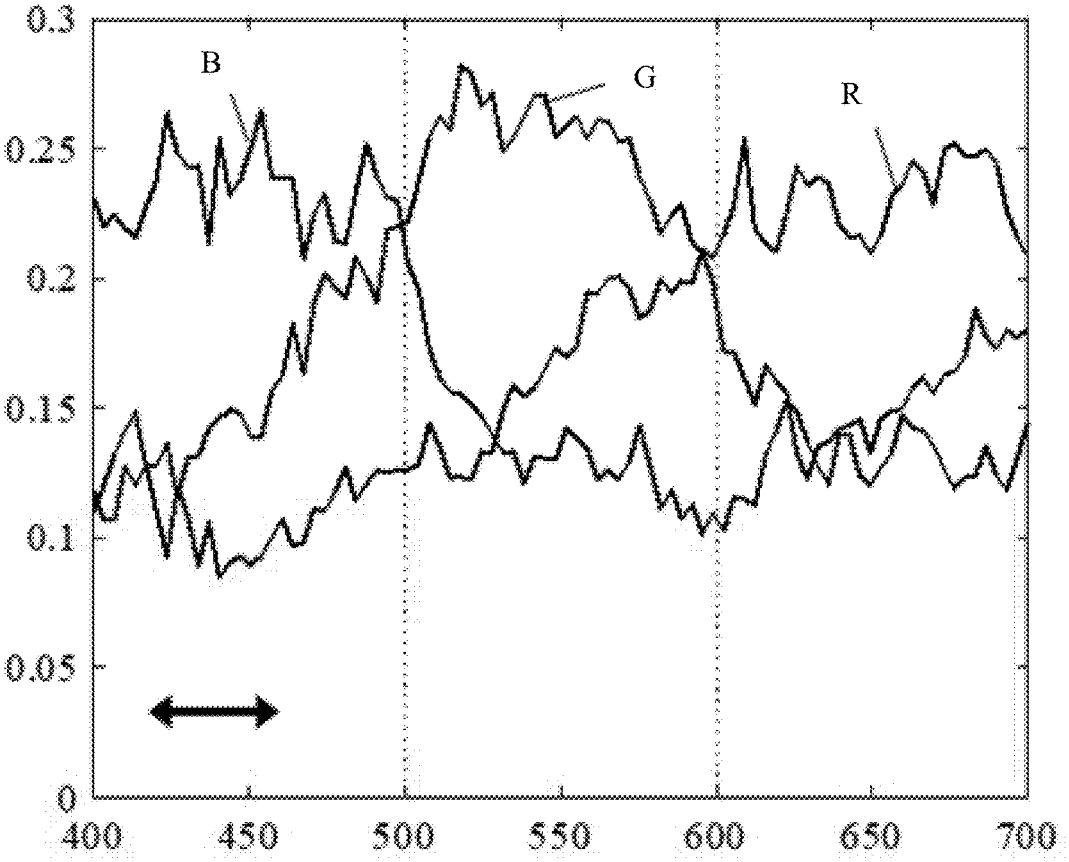
FIG. 29 is an analog spectrum diagram of horizontal polarized light according to an embodiment of this application.
Figure 30:
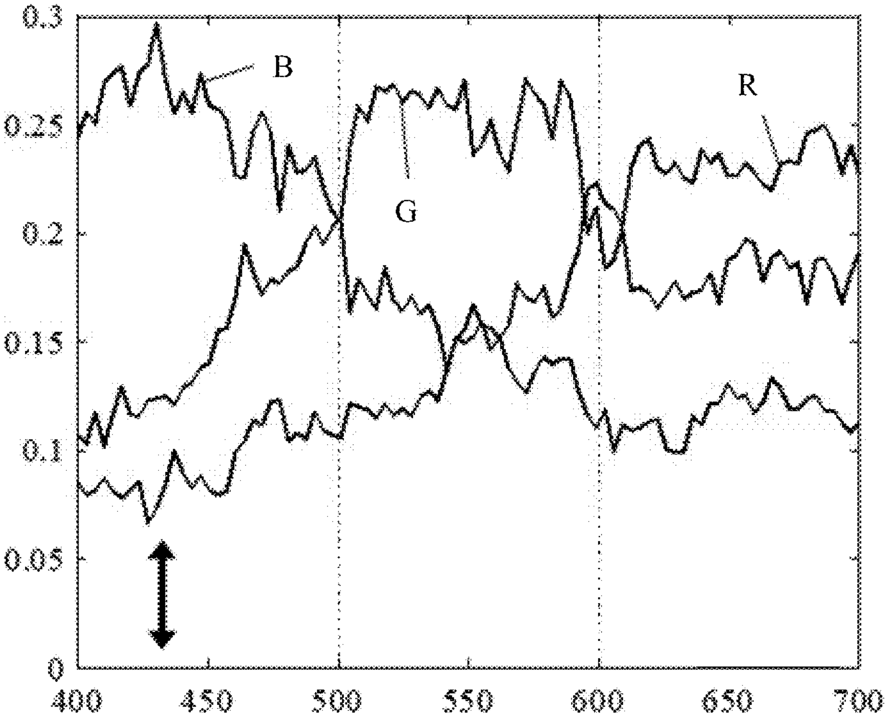
FIG. 30 is an analog spectrum diagram of vertical polarized light according to an embodiment of this application.

Analog spectrums of the light splitting unit in horizontal polarized light and vertical polarized light are respectively displayed in FIG. 29 and FIG. 30. As shown in FIG. 29, the average transmittance $T_{R1}$ of a curve R in the 600 nm to 700 nm band, the average transmittance $T_{G1}$ of a curve G in the 500 nm to 600 nm band, and the average transmittance $T_{B1}$ of a curve B in the 400 nm to 500 nm band are respectively 23.1%, 24.8%, and 23.4%. It can be learned that the light splitting efficiency of the light splitting unit in the horizontal polarized light is 23.8%. As shown in FIG. 30, the average transmittance $T_{R2}$ of a curve R in the band of 600 nm to 700 nm, the average transmittance $T_{G2}$ of a curve G in the band of 500 nm to 600 nm, and the average transmittance $T_{B2}$ of a curve B in the band of 400 nm to 500 nm are respectively 23.1%, 25.1%, and 25.1%. It can be learned that the light splitting efficiency of the light splitting unit in the vertical polarized light is 24.4%. However, efficiency of a polarization color separator in a related technology is approximately 16.7%, which may indicate that not only light splitting efficiency of the light splitting unit designed by using embodiments of this application is improved, but also good uniformity is achieved in both color separation and polarization splitting.

When the foregoing light splitting unit is used to perform color separation and polarization at the same time, the six detection sub-regions in FIG. 28 are used as an example. In the horizontal polarization, after passing through the light splitting unit, the red light band is mostly imaged in the upper left corner in the R region, and light spots are relatively concentrated; after passing through the light splitting unit, the green light band is mostly imaged in the upper middle in the G region, and light spots are relatively scattered; and after passing through the light splitting unit, the blue light band is mostly imaged at an intersection of the upper right corner in the B region and the upper middle in the G region, and light spots are relatively concentrated. In the vertical polarization, after passing through the light splitting unit, the red light band is mostly imaged in the lower left corner in the R region, and the light spots are relatively concentrated. However, a large part of light intensity is distributed in the center of the lower middle in the G region. After passing through the light splitting unit, the green light band is mostly imaged in the lower middle in the G region, and the light spots are relatively scattered; and after passing through the light splitting unit, the blue light band is mostly imaged in the lower right corner in the B region, and the light spots are relatively concentrated. It can be learned that the light splitting unit provided in this embodiment of this application has a good function of polarization and color separating.

When the light splitting unit provided in this application implements color separation and polarization separation at the same time, for distribution of light that is obtained through separation and that is of various colors and polarization combinations, refer to an arrangement manner of the detection sub-regions at the detection layer 12 in FIG. 28.

Figure 31:
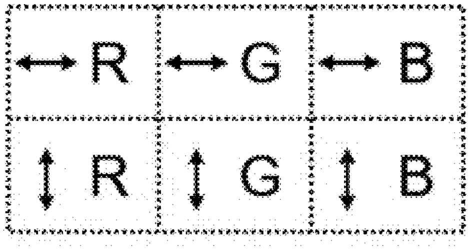
FIG. 31 to FIG. 40 are diagrams of distribution of a specific color and polarized light obtained through splitting by a light splitting unit according to an embodiment of this application.
Figure 32:
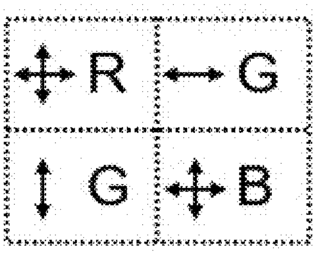
Figure 33:
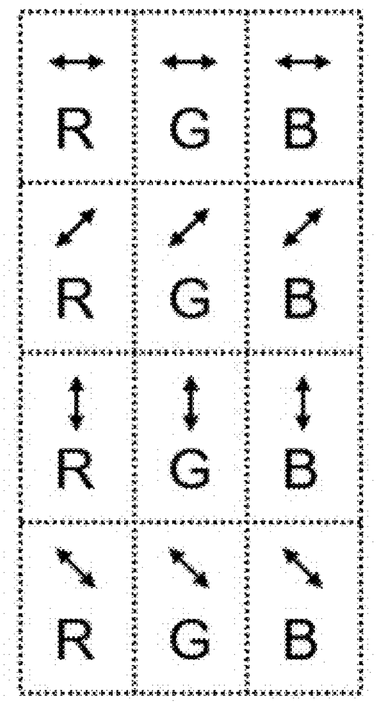
Figure 34:
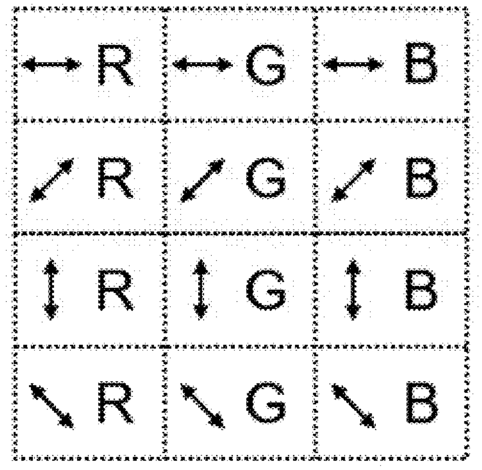
Figure 35:
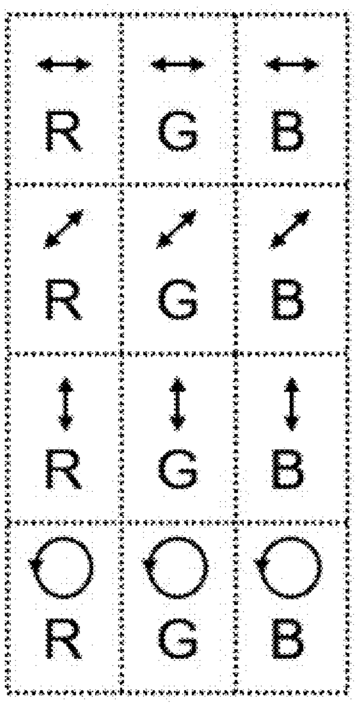
Figure 36:
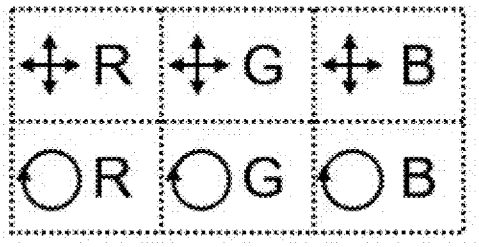
Figure 37:
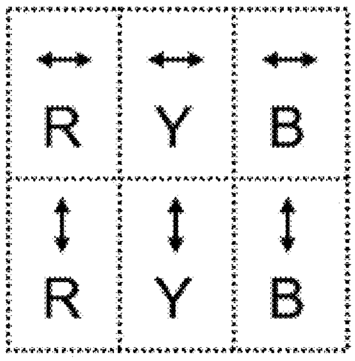
Figure 38:
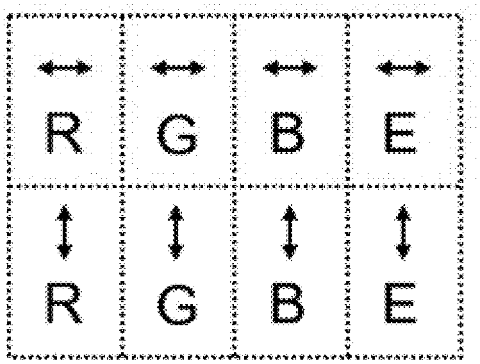
Figure 39:
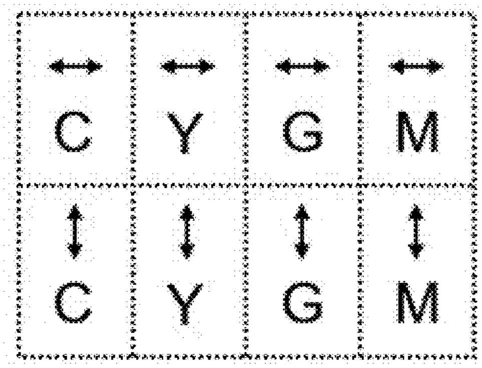

However, distribution of light split by the light splitting unit in this application is not limited thereto, and an arrangement manner of the corresponding detection sub-regions at the detection layer 12 is not limited thereto. For example, positions of horizontal polarized light and vertical polarized light may be exchanged in the manner in FIG. 31 compared with the manner in FIG. 28, or only polarization of green light may be separated in the manner in FIG. 32, and polarization of red light and polarization of blue light are not separated. For a manner of color separating based on RGB and polarization separating based on a basic polarization state (0°, 45°, 90°, and) 135°, for distribution of split light, refer to two implementations in FIG. 33 and FIG. 34. For a manner of color separating based on RGB and polarization separating based on a linear polarization and a circular polarization, for distribution of split light, refer to the implementations in FIG. 35 and FIG. 36. For a manner of using another color separation solution and polarization separation, FIG. 37 to FIG. 39 provide some examples of arrangement manners of the detection sub-regions. Certainly, only some examples are provided herein. An arrangement manner of the detection sub-regions in any combination of color separation and polarization separation may be another form.

Figure 40:
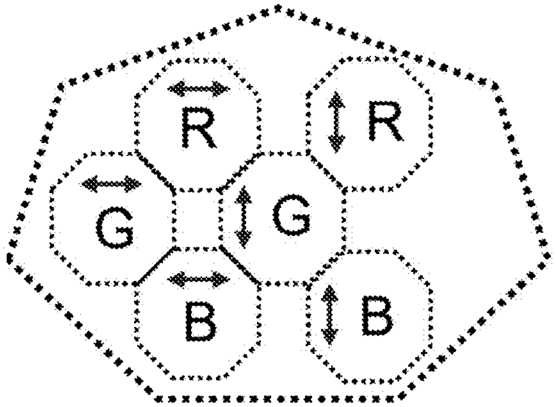

In addition, it should be noted that the detection sub-regions may be arranged in a regular arrangement manner shown in the foregoing accompanying drawings, or may be arranged in an irregular arrangement manner, for example, as shown in FIG. 40. This is not limited in this embodiment of this application.

In this embodiment of this application, a shape of the detection sub-region is not limited either, and may be a regular shape such as a rectangle or a hexagon, or may be another regular or irregular shape.

In the foregoing implementation, color separation and polarization separation are implemented by a same metasurface layer. In another implementation, color separation and polarization separation may also be implemented by two metasurface layers. The first metasurface layer 11 is configured to implement color separation.

Figure 41:
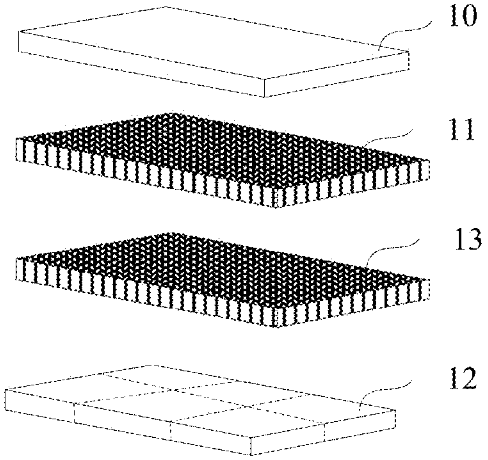
FIG. 41 is a diagram of a structure of an image sensor according to an embodiment of this application.

FIG. 41 is a diagram of a structure of an image sensor according to an embodiment of this application. Refer to FIG. 41. The image sensor further includes a second metasurface layer 13, and a first metasurface layer 11 is located between the second metasurface layer 13 and a cover 10.

The first metasurface layer 11 is configured to split a corresponding incident ray into light of a plurality of colors. The second metasurface layer 13 is configured to split light of each color split from the first metasurface layer 11 into a plurality of polarizations. A light splitting unit is not designed at the second metasurface layer 13 in a manner of the first metasurface layer 11. A pattern of each light splitting unit at the second metasurface layer 13 needs to be separately designed and optimized, and is obtained through optimization by using a reverse design algorithm.

Correspondingly, a detection layer 12 is configured to receive a plurality of types of light output by the second metasurface layer 13, convert the plurality of types of received light into electrical signals. Any two types of light in the plurality of types of light are different in at least one of color and polarization.

Certainly, positions of the first metasurface layer 11 and the second metasurface layer 13 may also be interchanged. That is, the second metasurface layer 13 is located between the first metasurface layer 11 and the cover 10. In this case, an incident ray first passes through the second metasurface layer 13 for polarization separation, and then enters the first metasurface layer 11 for color separation.

Correspondingly, the detection layer 12 is configured to receive a plurality of types of light output by the first metasurface layer 11, and convert the plurality of types of received light into electrical signals.

For the first metasurface layer 11, in some implementations of this application, a second pattern is directly obtained by translating a first pattern, and no other processing is required.

In some other implementations of this application, the second pattern is obtained by translating the first pattern and then changing a part of graphics in a translated pattern.

For example, a pixel in the translated pattern is changed, and a proportion of changed pixels in the translated pattern to a total quantity of pixels in a pattern of a first light splitting unit does not exceed a threshold.

For example, a value range of the threshold is 20% to 30%.

For example, the second pattern is obtained by changing no more than 20% of pixels in the translated first pattern.

For example, a form in which the pixel is changed includes at least one of the following:

changing a shape of the pixel, changing a quantity of first pixels, or changing an arrangement of a first pixel and a second pixel.

The first pixel and the second pixel are two types of pixels corresponding to different material refractive indexes in the plurality of pixels. For example, the material refractive index corresponding to the first pixel is higher than the material refractive index corresponding to the second pixel, that is, the first pixel is a black pixel in the pattern, and the second pixel is a white pixel in the pattern.

In some implementations of this application, a shape of the pixel is a rectangle.

In some other implementations of this application, a shape of the pixel may alternatively be a circle, a hexagon, or another regular or irregular shape. For a shape such as a circle, there is a gap between adjacent pixels, and the gap is usually filled with air or a material with a low refractive index that is the same as that of the white part.

Figure 42:
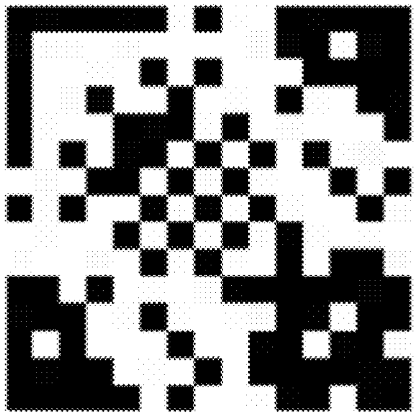
FIG. 42 is a diagram of a pattern obtained after a first pattern is translated according to an embodiment of this application.
Figure 43:
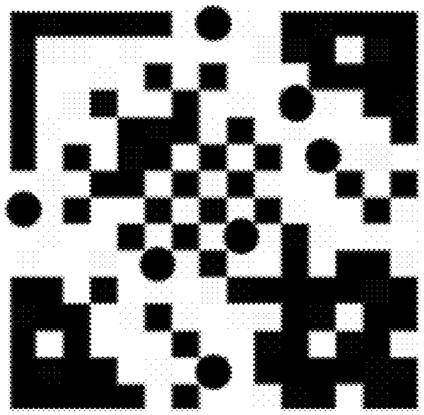
FIG. 43 is a diagram of a pattern obtained by changing a shape of a pixel of the pattern in FIG. 42 according to an embodiment of this application.

FIG. 42 is a diagram of a pattern obtained after the first pattern is translated according to this embodiment of this application. FIG. 43 is a diagram of a pattern obtained by changing a shape of a pixel in the pattern in FIG. 42 according to this embodiment of this application. Refer to FIG. 42 and FIG. 43. Shapes of a part of pixels change from rectangles to circles, but the part of pixels are relatively small, and are less than 20% of a total pixel in the first pattern.

FIG. 42 is still used as the pattern obtained after the first pattern is translated, and changing the quantity of first pixels includes the following two cases.

Figure 44:
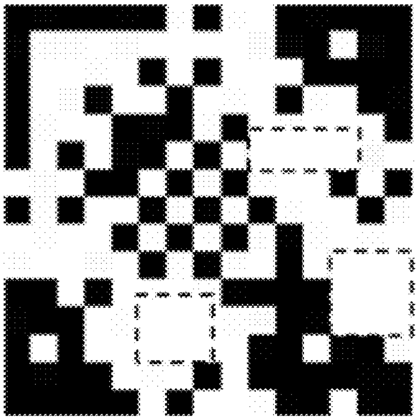
FIG. 44 to FIG. 46 are diagrams of a pattern obtained by changing a quantity of pixels and arranging the pattern in FIG. 42 according to an embodiment of this application.

In a first case, FIG. 44 is a diagram of a pattern obtained by changing a pixel refractive index by using the pattern in FIG. 42 according to this embodiment of this application. Refer to FIG. 42 and FIG. 44. A part of the first pixels are changed to second pixels, to form an effect that the first pixels are partially missing, that is, the quantity of first pixels is reduced. Refer to a position corresponding to a dashed line box in FIG. 44.

Figure 45:
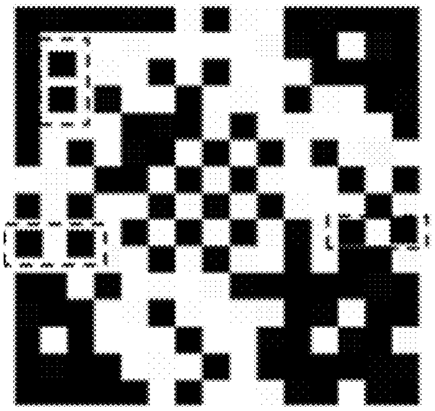

In a second case, FIG. 45 is a diagram of a pattern obtained by changing a pixel refractive index by using the pattern in FIG. 42 according to this embodiment of this application. Refer to FIG. 42 and FIG. 45. A part of second pixels are changed to first pixels, to form an effect of partially increasing first pixels, that is, increasing the quantity of first pixels. Refer to a position corresponding to a dashed line box in FIG. 45.

Figure 46:
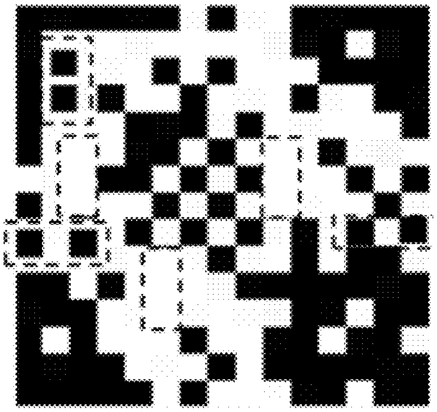

FIG. 46 is a diagram of a pattern obtained by changing a pixel refractive index by using the pattern in FIG. 42 according to this embodiment of this application. Refer to FIG. 42 and FIG. 46. A part of first pixels are changed to second pixels, and a part of second pixels are changed to first pixels, to form an effect of rearrangement of the first pixels and the second pixels. Refer to a position corresponding to a dashed line box in FIG. 46.

Figure 47:
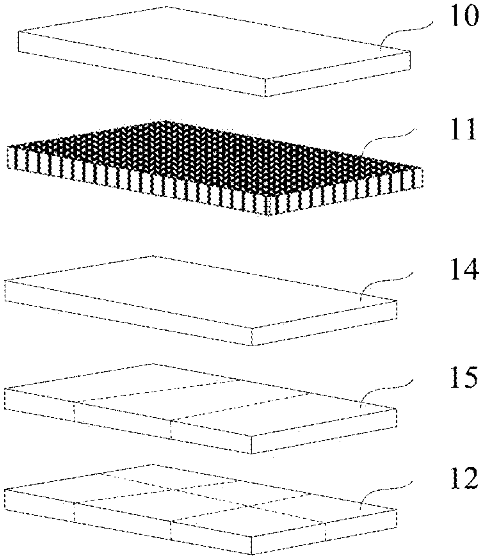
FIG. 47 is a diagram of a structure of an image sensor according to an embodiment of this application.

FIG. 47 is a diagram of a structure of an image sensor according to an embodiment of this application. Refer to FIG. 47. Compared with the structure of the image sensor shown in FIG. 1, the structure of the image sensor may further include an interval region 14. The interval region 14 is located between a first metasurface layer 11 and a detection layer 12. The interval region 14 is configured to limit a distance between the first metasurface layer 11 and the detection layer 12, so as to ensure that light split from the first metasurface layer 11 can be imaged in a detection region of the detection layer 12.

For example, a filler, for example, a transparent material, may be disposed in the interval region 14 in this application, or no filler may be disposed.

Refer to FIG. 47 again. The image sensor may further include a light filter 15. The light filter 15 is located between the interval region 14 and the detection layer 12. The light filter 15 is configured to separately filter light of a plurality of colors split by a light splitting unit, to filter out other stray light except light of a specific color, that is, filter out stray light of another color in light of each color of the plurality of colors, thereby reducing crosstalk, and further improving color separation performance of a component. For example, if light of a plurality of colors split from the first metasurface layer 11 includes a beam of red light, when the red light is filtered, the light filter 15 filters out a part except red, thereby reducing interference of another color, that is, reducing crosstalk.

For example, the light filter 15 includes a plurality of sub-pixels, and distribution of the sub-pixels of the light filter 15 corresponds to arrangement of detection sub-regions at the detection layer.

For example, if the metasurface layer implements a color separation function and a polarization separation function, that is, R, G, and B tricolor separation is performed, and polarized light in a horizontal direction and a vertical direction is separated. Each detection region of the detection layer should be divided into six detection sub-regions, which are respectively: R-horizontal, G-horizontal, B-horizontal, R-vertical, G-vertical, and B-vertical, and distribution is shown in FIG. 28. In this case, three sub-pixels are correspondingly arranged in the light filter 15, which are respectively red, green, and blue, and correspond to six detection sub-regions. For example, the red sub-pixel is correspondingly located above the two detection sub-regions R-horizontal and R-vertical. Each sub-pixel filters out light of other colors. For example, the red sub-pixel filters out light of other colors and only red light passes through the red sub-pixel. Because of a two-dimensional attribute of the metasurface layer, although the image sensor has both the metasurface layer and the light filter, the image sensor has a relatively small size, and can be miniaturized.

Figure 48:
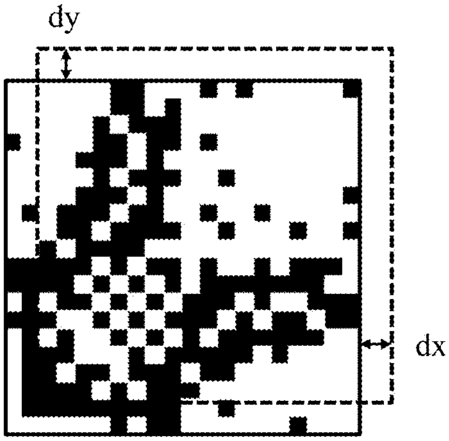
FIG. 48 and FIG. 49 are diagrams of an assembly tolerance of a metasurface layer according to an embodiment of this application.
Figure 49:
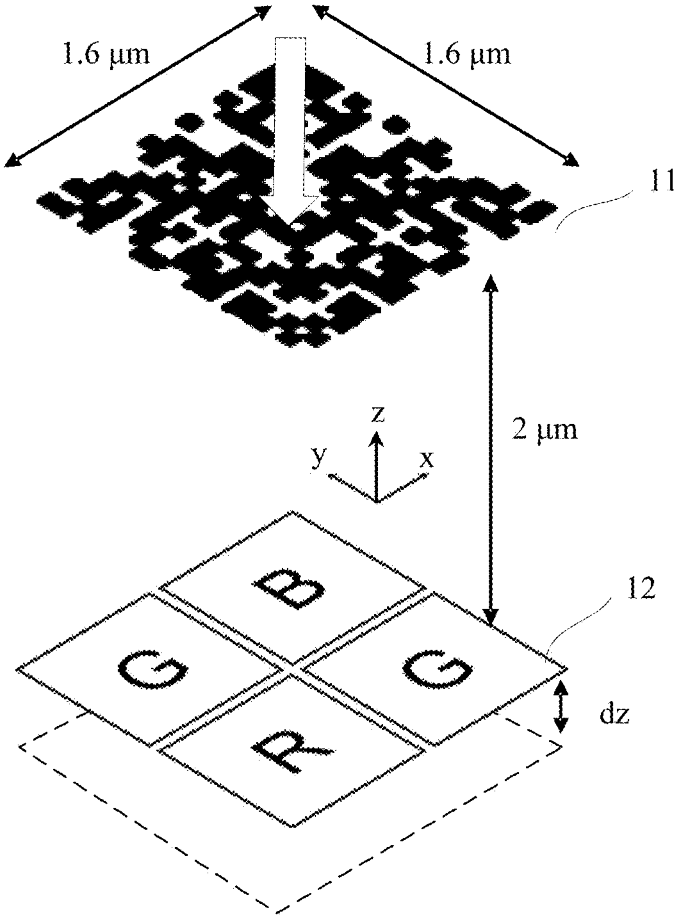

To ensure quality of the image sensor, during designing of the metasurface layer provided in this embodiment of this application, assembly tolerances in three dimensions x, y, and z that may exist in actual processing and use need to be considered. As shown in FIG. 48 and FIG. 49, if dx (an assembly tolerance in an x direction), dy (an assembly tolerance in a y direction), and dz (a tolerance of spacing between the first metasurface layer and the detection layer in a z direction) are excessively large, an effect of the entire image sensor is inevitably caused. Therefore, dx, dy, and dz need to be within a specific precision range. For example, $dx \in [-x/3, x/3]$, $dy \in [-y/3, y/3]$, and $dz \in [-z_0/4, z_0/4]$, where x and y are sizes of a single light splitting unit in the x and y directions respectively, and $z_0$ is a distance between the light splitting unit and the detection layer.

In this embodiment of this application, a metasurface layer having a large-area two-dimensional mosaic pattern is designed by using a position relationship between an incident angle of an incident ray and a light splitting unit in a paraxial approximation condition, so that a problem of angle sensitivity of the metasurface layer in a conventional design is resolved, a design method is simplified, and design efficiency is improved. A mosaic pattern designed by using a position relationship between an incident angle and a light splitting unit has higher diffraction efficiency, so that performance of the image sensor can be improved.

The metasurface layer can implement both color separation and polarization separation, and implement separation, reconstruction, and utilization of color and polarization information, thereby improving light utilization efficiency, increasing imaging information, and further improving imaging quality.

In addition, because the metasurface layer is of a micro-nano structure, has a small size and a compact volume, and is compatible with a CMOS technology, the metasurface layer may be directly integrated into a CMOS chip, and is easily integrated into any optical system. The metasurface structure may be implemented based on a mature micro-nano preparation technology, which has low preparation difficulty and is easy to implement mass production. In addition, the structure has a specific assembly tolerance, and in a processing process, a requirement on a processing technology is reduced.

The image sensor provided in this embodiment of this application not only may be applied to a visible light band to implement imaging, but also may be applied to an infrared band, an ultraviolet band, or even a band such as terahertz, microwave, or radio, to implement light splitting or beam splitting of waves of different bands.

An embodiment of this application further provides an electronic device. The electronic device includes the image sensor shown in any one of FIG. 1 to FIG. 49.

For example, the electronic device includes but is not limited to a mobile phone, a tablet computer, a camera, a camera lens, and the like.

The image sensor is applied to a camera module of the electronic device.

Figure 50:
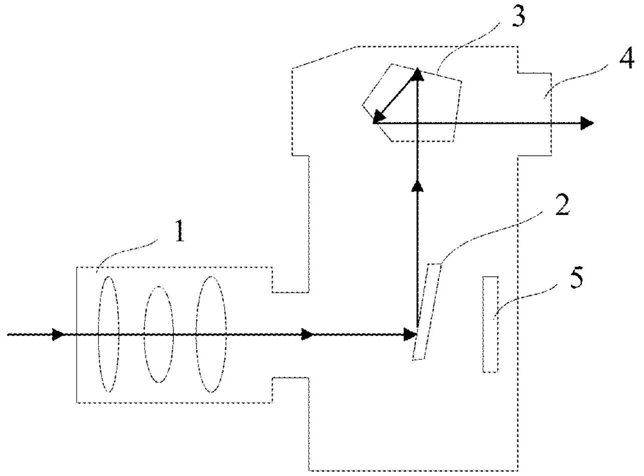
FIG. 50 is a diagram of a structure of a camera module according to an embodiment of this application.

FIG. 50 is a diagram of a structure of the camera module according to this embodiment of this application. Refer to FIG. 50. The camera module includes a lens 1, a reflector 2, a penta prism 3, a viewfinder 4, and an image sensor 5.

As shown in FIG. 50, an incident ray enters the viewfinder 4 through the lens 1, the reflector 2, and the penta prism 3, and then enters a human eye. When the human eye determines that a scene is a photographing scene, a shutter is pressed. In this case, the reflector 2 is quickly lifted, and the incident ray directly illuminates the image sensor 5 on a right side. The image sensor 5 converts an optical signal into an electrical signal.

The electronic device further includes a processor. The processor is configured to receive the electrical signal output by the image sensor 5, and process the electrical signal. For example, the electrical signal is recombined to generate an image, and the image is stored in a memory card of the electronic device.

Certainly, the structure of the camera module is merely an example. A structure of the camera module is not limited in this application, provided that the foregoing image sensor is included.

It should be noted that the image sensor provided in this application may not only be used in a consumer-grade camera or a mobile phone terminal, but also be integrated in an industrial-grade camera, an imaging system, or a display system, to implement application in fields such as environment monitoring and agricultural monitoring.

Figure 51:
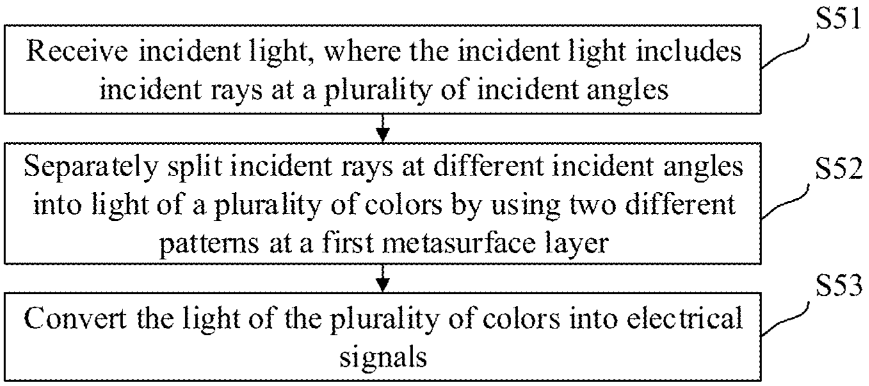
FIG. 51 is a flowchart of an image sensing method according to an embodiment of this application.

FIG. 51 is a flowchart of an image sensing method according to an embodiment of this application. The method is implemented by the foregoing image sensor. Refer to FIG. 51. The image sensing method includes the following steps.

S51: Receive incident light, where the incident light includes incident rays at a plurality of incident angles.

S52: Separately split incident rays at different incident angles into light of a plurality of colors by using two different patterns at a first metasurface layer, where one of the two different patterns is obtained by transforming the other one of the two different patterns.

S53: Convert the light of the plurality of colors into electrical signals.

In the image sensing method provided in this application, light splitting is performed on the different incident angles by using the two different patterns at the first metasurface layer. One of the two different patterns is obtained by transforming the other one of the two different patterns. Therefore, during manufacturing of the metasurface layer, a pattern of each light splitting unit does not need to be designed and manufactured in a targeted manner, thereby simplifying a manufacturing process of the metasurface layer, and improving manufacturing efficiency of the metasurface layer.

Optionally, the method further includes:

splitting the incident rays at the different incident angles into light of a plurality of polarizations by using the two different patterns at the first metasurface layer.

The converting light of the plurality of colors into electrical signals includes:

converting a plurality of types of light output by the first metasurface layer into the electrical signals, where any two types of light in the plurality of types of light are different in at least one of color and polarization.

Optionally, the method further includes:

splitting received light into light of a plurality of polarizations by using the second metasurface layer.

The second metasurface layer receives light output by the first metasurface layer, and the converting light of the plurality of colors into electrical signals includes: converting a plurality of types of light output by the second metasurface layer into the electrical signals, where any two types of light in the plurality of types of light are different in at least one of color and polarization.

Alternatively, the second metasurface layer receives incident light, the first metasurface layer receives light output by the second metasurface layer, and the converting light of the plurality of colors into electrical signals includes: converting the plurality of types of light output by the first metasurface layer into the electrical signals, where any two types of light in the plurality of types of light are different in at least one of color and polarization.

When two metasurface layers are used herein, color separation may be performed before polarization separation, or polarization separation may be performed before color separation.

Optionally, the method further includes the following.

Before the light of the plurality of colors is converted into the electrical signals, the light of the plurality of colors is separately filtered, to filter out stray light of another color in light of each color in the light of plurality of colors, thereby reducing crosstalk and further improving color separation performance.

For example, if the light of the plurality of colors split from the first metasurface layer includes a beam of red light, when the red light is filtered, a part except red is filtered out, thereby reducing interference of another color, that is, reducing crosstalk.

The invention claimed is:

1. An image sensor, comprising:

a cover;

a first metasurface layer; and a detection layer, wherein the first metasurface layer is located between the cover and the detection layer, wherein the first metasurface layer is configured to receive incident light, the incident light comprises incident rays at a plurality of incident angles, the first metasurface layer comprises a plurality of light splitting units, different light splitting units correspondingly receive incident rays from different incident angles, the plurality of light splitting units comprise a first light splitting unit and a second light splitting unit, the first light splitting unit and the second light splitting unit have different patterns, the first light splitting unit and the second light splitting unit separately split corresponding incident rays into light of a plurality of colors by using the different patterns, and a pattern of the second light splitting unit is obtained by transforming a pattern of the first light splitting unit, wherein the second light splitting unit is located on a first side of the first light splitting unit, the pattern of the second light splitting unit is obtained by translating the pattern of the first light splitting unit towards a second side, and the second side and the first side are two opposite sides of the first light splitting unit, and wherein the detection layer is configured to receive light of a plurality of colors split by the plurality of light splitting units, and convert the received light of the plurality of colors into electrical signals.

2. The image sensor according to claim 1, wherein the pattern of the second light splitting unit is obtained by translating the pattern of the first light splitting unit, and a direction and a distance of the translation are determined based on a position relationship between the second light splitting unit and the first light splitting unit.

3. The image sensor according to claim 2, wherein the distance of the translation is positively correlated with a distance between the second light splitting unit and the first light splitting unit.

4. The image sensor according to claim 1, wherein patterns of any two adjacent light splitting units are different.

5. The image sensor according to claim 1, wherein the plurality of light splitting units are arranged in an array, one row or one column of light splitting units are divided into a plurality of groups of light splitting units, one group of light splitting units in the plurality of groups of light splitting units comprises a plurality of light splitting units that are consecutively arranged, and the plurality of light splitting units that are consecutively arranged have a same pattern.

6. The image sensor according to claim 1, wherein the plurality of light splitting units comprise a plurality of second light splitting units, and the plurality of second light splitting units are arranged around the first light splitting unit.

7. The image sensor according to claim 1, wherein an incident angle of an incident ray corresponding to the first light splitting unit is within a range centered on 0°.

8. The image sensor according to claim 1, wherein the first metasurface layer is further configured to split a corresponding incident ray into light of a plurality of polarizations; and the detection layer is configured to: receive a plurality of types of light output by the first metasurface layer, and convert the plurality of types of received light into electrical signals, wherein any two types of light in the plurality of types of light are different in at least one of color and polarization.

9. The image sensor according to claim 1, wherein the image sensor further comprises a second metasurface layer;

the second metasurface layer is configured to split received light into light of a plurality of polarizations; and the second metasurface layer is located between the cover and the first metasurface layer, and the detection layer is configured to: receive a plurality of types of light output by the first metasurface layer, and convert the plurality of types of received light into electrical signals; or the first metasurface layer is located between the cover and the second metasurface layer, and the detection layer is configured to: receive a plurality of types of light output by the second metasurface layer, and convert the plurality of types of received light into electrical signals, wherein any two types of light in the plurality of types of light are different in at least one of color and polarization.

10. The image sensor according to claim 1, wherein the pattern of the second light splitting unit is obtained by translating the pattern of the first light splitting unit and then changing a part of graphics in a translated pattern.

11. The image sensor according to claim 10, wherein the pattern of the first light splitting unit comprises a plurality of pixels arranged in an array; and a proportion of changed pixels in the translated pattern to a total quantity of pixels in the pattern of the first light splitting unit does not exceed a threshold.

12. The image sensor according to claim 11, wherein a value range of the threshold is 20% to 30%.

13. The image sensor according to claim 11, wherein a form in which the pixel is changed comprises at least one of the following:

changing a shape of the pixel, changing a quantity of first pixels, or changing an arrangement of a first pixel and a second pixel, wherein the first pixel and the second pixel are two types of pixels corresponding to different material refractive indexes in the plurality of pixels.

14. The image sensor according to claim 11, wherein the distance of the translation is an integer multiple of a pixel size.

15. The image sensor according to claim 1, wherein the image sensor further comprises a light filter, and wherein the light filter is located between the first metasurface layer and the detection layer, and the light filter is configured to separately filter light of a plurality of colors split by the first light splitting unit or the second light splitting unit, to filter out stray light of another color in light of each color in the light of the plurality of colors.

16. An electronic device, comprising:

one or more processors; and an image sensor coupled to the one or more processors, wherein the one or more processors are configured to process an electrical signal output by the image sensor, wherein the image sensor comprises a cover, a first metasurface layer, and a detection layer, and the first metasurface layer is located between the cover and the detection layer, wherein the first metasurface layer is configured to receive incident light, the incident light comprises incident rays at a plurality of incident angles, the first metasurface layer comprises a plurality of light splitting units, different light splitting units correspondingly receive incident rays from different incident angles, the plurality of light splitting units comprise a first light splitting unit and a second light splitting unit, the first light splitting unit and the second light splitting unit have different patterns, the first light splitting unit and the second light splitting unit separately split corresponding incident rays into light of a plurality of colors by using the different patterns, and a pattern of the second light splitting unit is obtained by transforming a pattern of the first light splitting unit, wherein the second light splitting unit is located on a first side of the first light splitting unit, the pattern of the second light splitting unit is obtained by translating the pattern of the first light splitting unit towards a second side, and the second side and the first side are two opposite sides of the first light splitting unit, and wherein the detection layer is configured to receive light of a plurality of colors split by the plurality of light splitting units, and convert the received light of the plurality of colors into electrical signals.

17. The electronic device according to claim 16, wherein the pattern of the second light splitting unit is obtained by translating the pattern of the first light splitting unit, and a direction and a distance of the translation are determined based on a position relationship between the second light splitting unit and the first light splitting unit.

18. The electronic device according to claim 17, wherein the distance of the translation is positively correlated with a distance between the second light splitting unit and the first light splitting unit.

* * * * *